US008568224B1

(12) United States Patent
Itkis et al.

(10) Patent No.: US 8,568,224 B1
(45) Date of Patent: Oct. 29, 2013

(54) WIRELESS WAGERING SYSTEM

(75) Inventors: Yuri Itkis, Las Vegas, NV (US); Boris Itkis, Las Vegas, NV (US)

(73) Assignee: FortuNet, Inc., Las Vegas, NV (US)

( * ) Notice: Subject to any disclaimer, the term of this patent is extended or adjusted under 35 U.S.C. 154(b) by 628 days.

(21) Appl. No.: 10/852,824

(22) Filed: May 25, 2004

Related U.S. Application Data

(63) Continuation-in-part of application No. 10/011,648, filed on Dec. 4, 2001.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................... 463/29; 463/16; 463/17; 463/30; 463/40; 463/42; 455/411

(58) Field of Classification Search
USPC ............... 463/29, 16, 17, 30, 40, 42; 455/411
See application file for complete search history.

(56) References Cited

U.S. PATENT DOCUMENTS 1,310,719 A 7/1919 Vernam
3,868,018 A 2/1975 Thies
4,254,404 A 3/1981 White
4,270,370 A 6/1981 Oftelie
4,339,798 A * 7/1982 Hedges et al. .................. 463/26
4,378,940 A 4/1983 Gluz et al.
4,455,025 A 6/1984 Itkis
4,534,012 A 8/1985 Yokozawa
4,534,373 A 8/1985 Glinka et al.
4,624,462 A 11/1986 Itkis
4,670,857 A 6/1987 Rackman
RE32,480 E 8/1987 Bolan (Continued)

FOREIGN PATENT DOCUMENTS

EP 1112765 A1 7/2001

OTHER PUBLICATIONS

Green, Marian, "Expanding Casino Borders", International Gaming and Wagering Business, Sep. 2001, p. 50.
Trimon Systems, Inc., Mobile Casino Solution, Oct. 2001, 3 pgs.

(Continued)

*Primary Examiner* — Omkar Deodhar
*Assistant Examiner* — Adetokunbo O Torimiro
(74) *Attorney, Agent, or Firm* — Greenberg Traurig

(57) ABSTRACT

A casino game is implemented on the basis of a wireless mobile player unit adapted to play poker, slots, bingo and other casino games. The unit obtains random game outcomes from a central computer over a radio channel utilizing a data authentication and/or encryption technique relying on a database of authentication keys. The authentication key database and, optionally, key selection criteria are downloaded into the unit from the central computer via a secure communication channel. The data authentication key database is preferably used only once, and is replaced with a new database for each session. Alternatively, a database of keys may be resident on the player unit and an encryption selection sequence or algorithm is securely downloaded before the start of a gaming session, which is then used to choose a different authentication key for each transaction occurring during the session. Authentication keys may also be used as encryption keys to further protect the data. An encryption key database and/or selection criteria may be generated by either the central computer, the player unit or a combination of both.

51 Claims, 19 Drawing Sheets

(56) References Cited

U.S. PATENT DOCUMENTS

| | | | | | |
|---|---|---|---|---|---|
| 4,760,527 | A | * | 7/1988 | Sidley | 463/13 |
| 4,768,151 | A | | 8/1988 | Birenbaum et al. | |
| 4,856,787 | A | * | 8/1989 | Itkis | 273/237 |
| 4,871,054 | A | | 10/1989 | Murray | |
| 4,909,516 | A | | 3/1990 | Kolinsky | |
| 5,007,649 | A | | 4/1991 | Richardson | |
| 5,043,887 | A | | 8/1991 | Richardson | |
| 5,054,787 | A | | 10/1991 | Richardson | |
| 5,072,381 | A | | 12/1991 | Richardson et al. | |
| 5,096,195 | A | | 3/1992 | Gimmon | |
| 5,119,295 | A | | 6/1992 | Kapur | |
| 5,179,517 | A | | 1/1993 | Sarbin et al. | |
| 5,212,636 | A | | 5/1993 | Nakazawa | |
| 5,230,514 | A | | 7/1993 | Frain | |
| 5,276,312 | A | | 1/1994 | McCarthy | |
| 5,326,104 | A | | 7/1994 | Pease et al. | |
| 5,417,424 | A | | 5/1995 | Snowden et al. | |
| 5,478,084 | A | | 12/1995 | Itkis | |
| 5,507,489 | A | * | 4/1996 | Reibel et al. | 463/17 |
| 5,569,082 | A | | 10/1996 | Kaye | |
| 5,609,337 | A | | 3/1997 | Clapper, Jr. | |
| 5,621,890 | A | | 4/1997 | Notarianni et al. | |
| 5,643,086 | A | | 7/1997 | Alcorn et al. | |
| 5,655,966 | A | | 8/1997 | Werdin, Jr. et al. | |
| 5,709,603 | A | | 1/1998 | Kaye | |
| 5,718,631 | A | | 2/1998 | Invencion | |
| 5,738,583 | A | | 4/1998 | Comas et al. | |
| 5,770,533 | A | * | 6/1998 | Franchi | 463/42 |
| 5,779,545 | A | | 7/1998 | Berg et al. | |
| 5,791,990 | A | | 8/1998 | Schroeder et al. | |
| 5,800,268 | A | | 9/1998 | Molnick | |
| 5,810,664 | A | | 9/1998 | Clapper | |
| 5,812,641 | A | | 9/1998 | Kanoh et al. | |
| 5,871,398 | A | | 2/1999 | Schneier et al. | |
| 5,915,588 | A | | 6/1999 | Stoken et al. | |
| 5,928,082 | A | | 7/1999 | Clapper | |
| 5,934,439 | A | | 8/1999 | Kanoh et al. | |
| 5,949,042 | A | | 9/1999 | Dietz et al. | |
| 5,951,396 | A | | 9/1999 | Tawil | |
| 5,954,582 | A | | 9/1999 | Zach | |
| 5,967,895 | A | | 10/1999 | Kellen | |
| 5,978,569 | A | | 11/1999 | Traeger | |
| 5,980,385 | A | | 11/1999 | Clapper | |
| 5,999,808 | A | | 12/1999 | LaDue | |
| 6,001,016 | A | | 12/1999 | Walker et al. | |
| 6,012,983 | A | | 1/2000 | Walker et al. | |
| 6,015,346 | A | | 1/2000 | Bennett | |
| 6,024,640 | A | | 2/2000 | Walker et al. | |
| 6,048,269 | A | | 4/2000 | Burns et al. | |
| 6,056,289 | A | | 5/2000 | Clapper | |
| 6,071,190 | A | | 6/2000 | Weiss et al. | |
| 6,086,471 | A | | 7/2000 | Zimmermann | |
| 6,089,979 | A | | 7/2000 | Klein | |
| 6,102,798 | A | | 8/2000 | Bennett | |
| 6,106,396 | A | | 8/2000 | Alcorn et al. | |
| 6,110,044 | A | | 8/2000 | Stern | |
| RE36,946 | E | | 11/2000 | Diffie et al. | |
| 6,149,522 | A | | 11/2000 | Alcorn et al. | |
| 6,176,781 | B1 | | 1/2001 | Walker et al. | |
| 6,199,161 | B1 | * | 3/2001 | Ahvenainen | 713/155 |
| 6,210,279 | B1 | | 4/2001 | Dickinson | |
| 6,218,796 | B1 | | 4/2001 | Kozlowski | |
| 6,261,177 | B1 | | 7/2001 | Bennett | |
| 6,266,413 | B1 | | 7/2001 | Shefi | |
| 6,270,410 | B1 | | 8/2001 | DeMar et al. | |
| 6,311,976 | B1 | | 11/2001 | Yoseloff et al. | |
| 6,354,941 | B2 | | 3/2002 | Miller et al. | |
| 6,394,907 | B1 | | 5/2002 | Rowe | |
| 6,416,414 | B1 | | 7/2002 | Stadelmann | |
| 6,424,260 | B2 | | 7/2002 | Maloney | |
| 6,443,843 | B1 | | 9/2002 | Walker et al. | |
| 6,445,795 | B1 | | 9/2002 | Sako et al. | |
| 6,471,591 | B1 | | 10/2002 | Crumby | |
| 6,500,067 | B1 | | 12/2002 | Luciano et al. | |
| 6,527,638 | B1 | | 3/2003 | Walker et al. | |
| 6,572,471 | B1 | | 6/2003 | Bennett | |
| 6,607,439 | B2 | | 8/2003 | Schneier et al. | |
| 6,616,531 | B1 | | 9/2003 | Mullins | |
| 6,628,939 | B2 | | 9/2003 | Paulsen | |
| 6,634,942 | B2 | | 10/2003 | Walker et al. | |
| 6,644,455 | B2 | | 11/2003 | Ichikawa | |
| 6,645,072 | B1 | | 11/2003 | Kellen | |
| 6,666,767 | B1 | | 12/2003 | Dayan | |
| 6,676,522 | B2 | | 1/2004 | Rowe et al. | |
| 6,682,421 | B1 | | 1/2004 | Rowe et al. | |
| 6,684,333 | B1 | | 1/2004 | Walker et al. | |
| 6,702,672 | B1 | | 3/2004 | Angell et al. | |
| 6,712,698 | B2 | | 3/2004 | Paulsen et al. | |
| 6,752,312 | B1 | | 6/2004 | Chamberlain et al. | |
| 6,769,991 | B2 | | 8/2004 | Fields | |
| 6,835,135 | B1 | | 12/2004 | Silverbrook et al. | |
| 6,846,238 | B2 | | 1/2005 | Wells | |
| 6,866,586 | B2 | | 3/2005 | Oberberger et al. | |
| 6,884,162 | B2 | | 4/2005 | Raverdy et al. | |
| 6,971,956 | B2 | | 12/2005 | Rowe et al. | |
| 7,008,317 | B2 | | 3/2006 | Cote et al. | |
| 7,153,206 | B2 | | 12/2006 | Bennett, III | |
| 7,422,213 | B2 | | 9/2008 | Katz et al. | |
| 7,494,414 | B2 | | 2/2009 | Hedrick et al. | |
| 7,611,407 | B1 | | 11/2009 | Itkis et al. | |
| 7,867,075 | B2 | | 1/2011 | Irwin, Jr. et al. | |
| 7,909,692 | B2 | | 3/2011 | Nguyen et al. | |
| 7,979,057 | B2 | | 7/2011 | Ortiz et al. | |
| 8,070,594 | B2 | | 12/2011 | Hedrick et al. | |
| 2001/0003100 | A1 | | 6/2001 | Yacenda | |
| 2001/0016514 | A1 | * | 8/2001 | Walker et al. | 463/17 |
| 2001/0019193 | A1 | | 9/2001 | Gumina | |
| 2001/0035425 | A1 | | 11/2001 | Rocco et al. | |
| 2002/0045477 | A1 | | 4/2002 | Dabrowski | |
| 2002/0082070 | A1 | | 6/2002 | Macke et al. | |
| 2002/0090986 | A1 | | 7/2002 | Cote et al. | |
| 2002/0094860 | A1 | | 7/2002 | Itkis et al. | |
| 2002/0098888 | A1 | | 7/2002 | Rowe et al. | |
| 2002/0111210 | A1 | | 8/2002 | Luciano et al. | |
| 2002/0193099 | A1 | | 12/2002 | Paulsen | |
| 2003/0017865 | A1 | * | 1/2003 | Beaulieu et al. | 463/16 |
| 2003/0064805 | A1 | | 4/2003 | Wells | |
| 2003/0104865 | A1 | | 6/2003 | Itkis et al. | |
| 2004/0038736 | A1 | | 2/2004 | Bryant et al. | |
| 2004/0157584 | A1 | * | 8/2004 | Bensimon et al. | 455/411 |
| 2004/0229677 | A1 | | 11/2004 | Gray et al. | |
| 2005/0027570 | A1 | * | 2/2005 | Maier et al. | 705/3 |
| 2005/0178841 | A1 | * | 8/2005 | Jones et al. | 235/468 |
| 2005/0239530 | A1 | | 10/2005 | Walker et al. | |
| 2006/0094492 | A1 | * | 5/2006 | Wolfe | 463/17 |

OTHER PUBLICATIONS

Nuvo Studios, Inc., “Corporate Profile”, Oct. 2001, 7 pgs.

Brown, Josh, “Biingo Playing Enhanced with New Innovations”, Bingo Manager, Jul. 2001, 3 pgs.

Schneier, Bruce, “Applied Cryptography, Second Edition”, book, 1996, pp. 1-18 and 47-74, published by John Wiley & Sons, Inc., New York, US and Canada.

FortuNet 2000; FortuNet, Inc.; Las Vegas, NV; circa 1994 Handout; 2 Pages.

FortuNet 2000; Fortunet, Inc.; Las Vegas, NV; circa 1995 Handout; 2 Pages.

Bingo Star by FortuNet, Inc.; Las Vegas, NV; Copyright 1996; 2 Pages.

National Bingo Buyer’s Guide; vol. 7, Fall ’95; 4 Pages.

So. King, Kitsap, Lewis, Pierce, Mason & Thurston; South Sound Edition “Bingo Bugle”, vol. 16, No. 1, Jan. 1995; 4 Pages.

Search report for WIPO publication WO 91/18468 A1, application PCT/US91/03583 ; Nov. 28, 1991.

Abstract for EPO publication EP 1 274 048 A2, application 02014785.6 ; Jul. 6, 2001.

Derwent abstracts for Japanese publications JP 2003-110756 A, JP 07-325959 A, JP 07-334737 A, and JP 08-124019 A ; 2003.

“Scarne’s Encyclopedia of Card Games,” by John Scarne, 1973 HarperCollins, chapters on poker and blackjack.

* cited by examiner

| | cell (37) | unit (33) | ready (38) | player (41) | balance (57) | pack (43) | key (82) | points (68) | . . . |
|---|---|---|---|---|---|---|---|---|---|
| 36 | 1 | 1 2 3 | 1 | 0 | | | | | |
| | 2 | 7 5 3 | 0 | 0 | | | | | |
| | . . . | | | | | | | | |
| | 30 | 0 | 0 | 0 | | | | | |
| 70 | 0 | 1 2 4 | 0 | 123456789 | 10.00 | 12354 | 7FD3221AB | 5 | |
| | 0 | 1 3 0 | 0 | 37894567 | 5.00 | 0 | AF354221F | 10 | |
| | . . . | | | | | | | | |
| 133 | 0 | 0 | 0 | 72434512 | 0 | 0 | 0 | 7 | |
| | 0 | 0 | 0 | 32145901 | 20.00 | 0 | 0 | 0 | |
| | . . . | | | | | | | | |

35

FIG. 5

WIRELESS WAGERING SYSTEM

CROSS-REFERENCE TO RELATED APPLICATIONS

This application is a continuation-in-part of application Ser. No. 10/011,648 filed Dec. 4, 2001 which is incorporated herein by reference in its entirety.

BACKGROUND

The present invention relates to gaming devices in general and, more specifically, to portable gaming devices suitable for use in gaming establishments such as casinos and bingo halls.

In recent years, radio-controlled hand-held or portable electronic bingo devices, such as disclosed in U.S. Pat. Nos. 4,455,025 and 4,624,462 both to Itkis and in bingo industry publications, including an article "Bingo Playing Enhanced With New Innovations", Bingo Manager, July, 2001, gained substantial popularity in casinos However, electronic bingo devices have been used as player "aids" rather than actual gaming devices such as slot machines. The main reason traditional gaming devices have not made their way into a wireless casino network has been concern for security and verification. As in all sensitive communication, there are always three concerns: (1) Authentication, (2) Integrity and (3) Non-repudiation. Schneider, Applied Cryptography: Protocols, Algorithms, and Source Code n C, 1995 Wiley, John & Sons at 2. In the bingo context, portable units have been used only to automatically or semi-automatically daub called numbers on a multiplicity of electronic facsimilies of bingo cards from a closed universe of bingo card permutations. Security of radio transmission of called numbers is of little concern since these data are public. On the other hand, a portable, wireless slot machine would require absolute authentication, assurance of integrity of signals and no credible way for a player to repudiate that she placed a losing bet.

Portable remote gaming devices have been proposed for playing "classic" casino games such as poker, slots and keno. In particular, U.S. Pat. Nos. 6,012,983 and 6,001,016 both issued to Walker, et al., propose to utilize pager-like devices for remote monitoring of the progress of a slot game executed automatically on a player's behalf on an actual slot machine available at a "casino warehouse." However, Walker limits play to passive observation of the game and, therefore, diminishes a player's interest in the game. Walker's approach requires a costly investment in real slot machines located remotely at a "casino warehouse." A commercial implementation of remote playing on a "warehoused" slot machine by GameCast Live as disclosed in "Expanding Casino Borders", International Gaming and Wagering Business, September 2001, suffers from the same deficiencies as Walker's disclosures. Moreover, although GameCast Live offers players convincing video and audio data streams originating at video cameras aimed at actual slot machines, such implementation is labor intensive and requires costly hardware. In addition, such an approach cannot provide a casino with an adequate number (e.g., several hundred) of remote wagering devices since the overall radio frequency (RF) bandwidth available for a casino is severely limited.

On the other hand, a cellular telephone-based approach to remote gaming being promoted by companies, such as Motorola, Inc., TRIMON Systems, Inc. and NuvoStudios, Inc., as disclosed, for example, in "NuvoStudios, Inc., Corporate Profile", NuvoStudios, Inc., October 2001 and "Mobile Casino Solution", TRIMON Systems, Inc., October 2001, does alleviate the issue of available radio frequency bandwidth. Yet, remote gaming on cellular telephones is functionally indistinguishable from gaming on the Internet. Although casinos are tempted by the lucrative prospects of Internet gaming, such as described in U.S. Pat. Nos. 5,800,268 to Molnick, 5,999,808 to La Due and 5,779,545 to Berg et al., the disclosed Internet wagering techniques cannot be directly transplanted into casino environment because of the vast differences between the security and integrity requirements of "brick-and-mortar" casinos and "click-and-mortar" casinos.

In a casino environment, the casino must be certain that wireless commands received are authentic, and attributable to the player sending the signal. The casino must further be confident that interference, accidental or deliberate, cannot cause an error, and can be documented. The casino must also be confident that a player cannot maintain an argument that she did not place a losing bet. The player of a wireless wagering device in a casino must be certain that no third party could gamble with her money, that wireless signals she sends to the casino are accurately interpreted and executed, and that the casino cannot falsely deny that a winning bet was placed.

SUMMARY

It is the primary objective of the present invention to provide a casino player with an opportunity to securely play casino games, such as poker, slots, keno and bingo "on the go" without the need for a stationary video and/or reel slot machine.

It is a further objective of the present invention to provide a casino player with a secure and verifiable method of playing a mobile casino game on a small device convenient for carrying on the person.

It is yet a further objective of the present invention to provide a secure, verifiable system and method, free from the threat of false repudiation, to communicate data with and between portable electronic devices in a casino.

These and further objectives will become apparent from the attached drawings and the following description of the preferred embodiment.

The above objectives are achieved through the present invention by providing a casino player with a wireless wagering device akin to a wireless PDA or an Internet-enabled cellular telephone. The preferred embodiment of a mobile wagering device, programmed to play typical casino games, including poker, slots, keno and bingo, incorporates a radio frequency transceiver, an infrared downloading port and a rechargeable battery. A player rents such a mobile player unit from the casino at a self-service dispensing kiosk or from a point of sale (POS) terminal. When dispensed from a kiosk, a player inserts a "player club card" into the kiosk's magnetic card reader and deposits money into the kiosk's bill validator The kiosk houses a number of mobile player units in its storage and recharging cells. Each of the kiosk's cells are networked over a local area network with a central PC-compatible computer controlling the kiosk. When rented from a POS terminal, a cashier handles the dispensing of the unit. The use of an automated, self-service kiosk as described in co-pending application Ser. Nos. 10/011,648 and 10/777,588 owned by the assignee of the present application is considered the best mode due to labor savings to the casino.

While the present invention is ideally suited for wireless wagering in a wide variety of casino-type games, we will describe the use of the present invention when playing the well-known game of bingo. When a player buys a pack of electronic bingo cards or gaming credits, the central computer downloads the purchased bingo cards or downloads credits from the portable unit's gaming account in the player unit which is securely plugged into the internal local area network, either when located inside the kiosk, or at a download port at the POS terminal. The central computer preferably maintains a strict transaction history of every transaction. In the best mode, the central computer maintains a SQL type transaction database on at least two mirrored drives, with one located at a secure remote location. Additionally, in the preferred embodiment, the player unit receives a plurality of indexed authentication keys in a database for use during subsequent radio transmission. For example, the mobile player unit might receive 10,000 authentication keys which are stored in the MPU's RAM. Alternatively, a database of authentication keys may reside in nonvolatile (ROM) memory of the player unit, and a key selection sequence or criteria is securely downloaded to the MPU's RAM when the player unit is plugged into the kiosk. Another alternative is for the player to input a key which causes the selection criteria algorithm to be generated on the player unit. The player input can be manual or by use of a hardware device such as a USB dongle, smart card, magnetic stripe card, memory chip, bar code, or any of a multitude of such devices. Optionally, signals from the player unit may be encrypted with encryption keys downloaded in the same way. The encryption keys may serve the dual function of being both encryption and authentication keys. It should be pointed out that authentication keys and encryption keys may be the same keys, or different sets of keys. Moreover, keys may be constructed from a multiplicity of other keys to form complex keys for authentication and/or encryption. See e.g., Schneider, supra at 47-74. Once the keys and/or selection criteria are securely downloaded to the player unit, a player can then take the downloaded unit out of the kiosk to any location on the casino floor for a round of play. Over a radio channel, the unit receives bingo data, such as bingo patterns and pseudo-random bingo numbers from the kiosk's central computer, and plays downloaded bingo cards automatically. The central computer automatically verifies all bingo cards downloaded into all rented mobile player units, detects winning bingo cards, computes the prizes due to the winning players and stores the outcomes of the games in an internal database. When a player re-inserts the player unit into a kiosk, ending a round of play, the kiosk automatically dispenses any winnings due the player through a bill dispenser and/or coin hopper. Alternatively, the player may return the unit to a POS terminal, reconnect to the secure download port and be paid by the cashier. The player unit is then ready to receive keys and/or key selection criteria for the next round of play. The central computer also maintains a database of the rented units and may award bonus points to players returning the rented units to the kiosk.

A player having a sufficient account balance can also purchase, by means of radio communications, bingo cards, keno cards or other gaming cards with the help of the mobile player unit located on the casino floor. In order to prevent fraud (such as false repudiation) and make radio communication with the unit secure, each transaction transmitted by the player unit is associated with a unique encryption key previously downloaded when plugged into the kiosk. The central computer authenticates each transaction received from each unit by looking up or computing the proper key for each transaction Even though a radio communication can be intercepted, such an internal downloading of the encryption key database and/or key selection criteria or criteria assures security of the subsequent communications between the central computer and the rented unit over the public radio channel, and the casino can be confident that a customer cannot succeed in a false charge that someone else played with her credits. As a result, a player can confidently place an order for purchasing bingo cards right from the casino floor in real time. For example, the central computer may download to MPU number 1 a list of 10,000 keys beginning with "A123, X456, BSD7 and BD50." In this highly simplified example, the first time the player presses a button to transmit data to the central unit, the signal is accompanied by the MPU serial number "985", transaction ID "1" and the authentication key "A123" The central computer receives the MPU serial number "985", transaction ID "1", the command "Buy 10 Cards" and the authentication key A123. The central computer looks up the proper key for transaction 1 and matches it successfully to its own matching database, responding by transmitting an acknowledgment to the mobile player unit plus 10 cards, decrementing the player account the cost of the cards and recording the serial numbers of the cards sold to MPU number 985. The second time the player with MPU number 985 presses a button to issue the command "Buy 5 Cards", the signal is accompanied by MPU serial number "985", transaction ID "2", the key "X456". When the central computer receives the command, unit serial number and transaction ID "2", accompanied by the key "X456", the master central computer looks up the authentication code and determines it is authentic, decrementing the player's account for the cost of 5 bingo cards, recording the serial numbers of the cards, and transmitting the cards to the player unit. If a hacker transmits a signal from a rogue machine designed to impersonate MPU number 985, the hacker does not have access to the database of keys that were downloaded to MPU number 985 before the round of play, so it transmits a request for 20 cards and accompanies the transmission with an transaction number "15" and (forged) authentication key "W45Y." The central computer looks up the authentication key that should accompany transaction ID 15 from MPU serial number 985, and determines that it does not properly match the appropriate key in the privately-uploaded database. The central computer does not execute the command, but notifies the casino's operator (and possibly the player) of a false signal constituting a possible attempted hack. If a proper key transmission is garbled by radio interference, the central computer may interpret it as a possible attempted hack. The operator may thus intervene and reestablish proper communication between the unit and the central computer, re-synchronizing the key database, or downloading a fresh database and/or selection criteria. In general, the system uses "guaranteed delivery communication," never incrementing to the next key, or allowing completion of a transaction unless and until a properly authenticated acknowledgment is received by the MPU from the central computer. The acknowledgment may be authenticated using the same database of keys, or a separate private key or sequence of keys.

It should be noted that a key may be used more than once, so long as it is in a randomized order. This allows smaller databases of keys to be downloaded to MPUs, saving download time and required memory capacity. It is preferred to use each authentication key only once, however. Less preferable is to reuse a key a low number of times. Additionally, it is also feasible for all, or a portion of the database of keys and/or the selection criteria to be generated by the MPU rather than the central computer, and then be uploaded to the central computer. The central computer will then store the uploaded data for further use in the process of authenticating communication with the MPU over a wireless channel. Among other things, this gives the user the opportunity to participate in the generation of the key database, such as allowing the user to enter a private password or phrase used to generate a key or selection criteria algorithm. It also potentially allows players to bring their own devices such as personal digital assistants (PDAs), laptop computers and telephones loaded with compatible software and use their own authentication key database or key selection criteria.

Secure, verifiable gaming over a public radio channel authenticated by encryption keys downloaded at a dispensing kiosk opens an opportunity for playing "classic" casino games, such as poker and slots, on the same mobile player unit. In this case, the player unit transmits authenticated encoded game requests, such as "deal a poker hand", "spin reels" and "draw keno balls", to the central computer. In response, the central computer broadcasts authenticated outcomes of the games determined by a software random number generator running on the central computer. The response received by the player unit determines the outcome of the game including winnings, if any, and a new credit balance. Each such request and each response thereto is authenticated by different and unique digital signatures based upon secure authentication keys either downloaded into the player unit from the central computer while the player unit remains inside the dispensing kiosk, or selected from a resident database of keys according to a random order which is specified by a selection key criteria which is downloaded. It should be noted that certain data transmitted to the player units are best not encrypted. These data include such information as whether the server is active, whether a game has started and the like. The disadvantage to encrypting such data is a hacker intercepting such transmission could gain clues as to the encryption scheme or keys from reading the contents and structure of a message with known meaning. Therefore, in the preferred embodiment, wireless transmissions during a game will include both encrypted data and unencrypted data.

BRIEF DESCRIPTION OF THE DRAWINGS

The invention is illustrated by the following drawings:

FIG. 5 illustrates a status table of the present invention;

FIG. 12 (*b*) illustrates a "spin request" data block of the present invention;

FIG. 12 (*c*) illustrates a "deal request" data block of the present invention;

FIG. 12 (*d*) illustrates a "draw request" data block of the present invention;

FIG. 13 (*b*) illustrates a "service response" data block of the present invention;

FIG. 17 (*b*) illustrates a "draw" data block of the present invention;

FIG. 18 (*b*) illustrates an infrared communication via a local area network of the present invention.

PREFERRED EMBODIMENT

Figure 1:
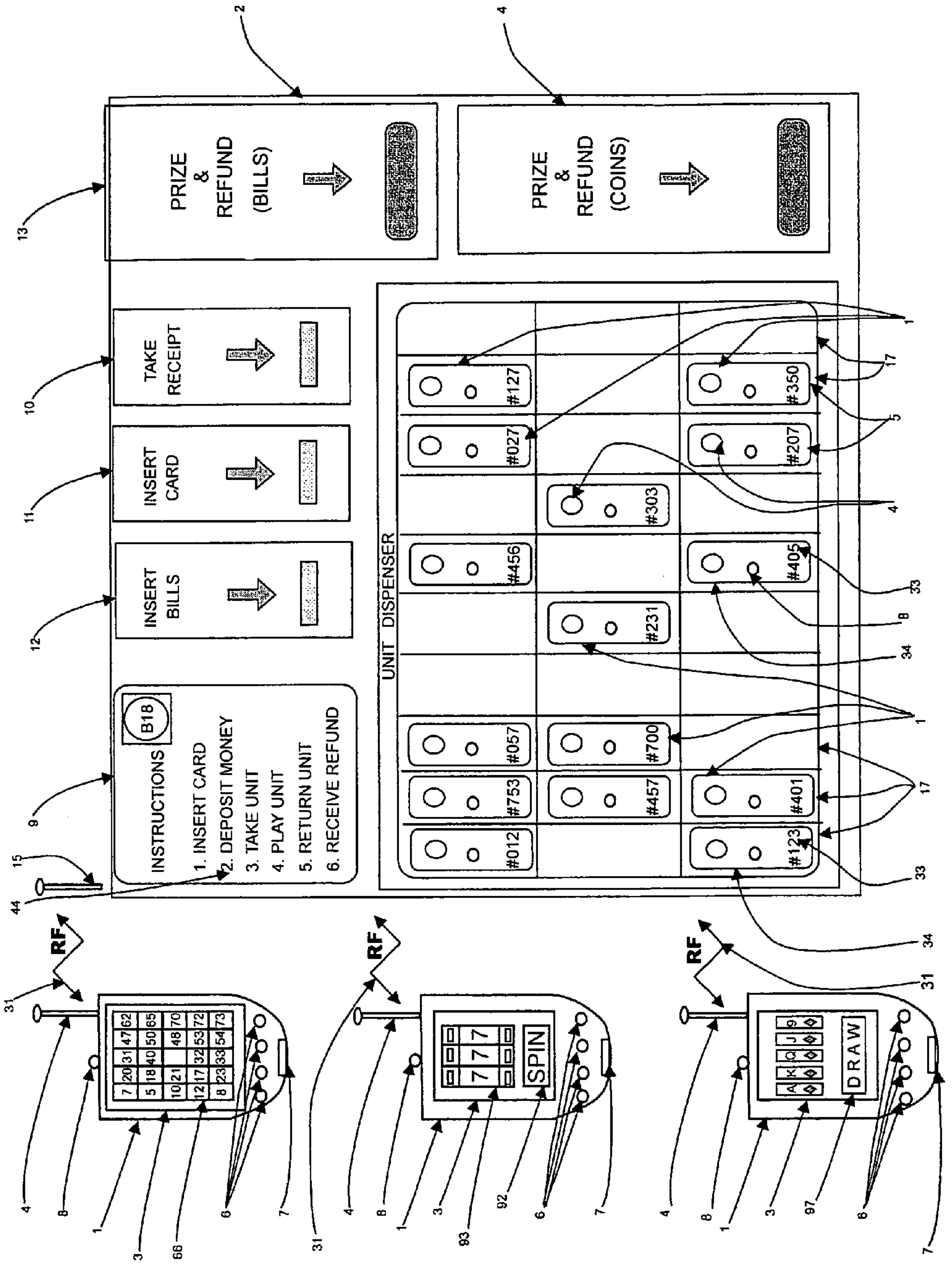
FIG. 1 illustrates a diagram of the preferred embodiment of the present invention.

As illustrated in FIG. 1, a preferred embodiment of the present invention includes two main elements, namely, a mobile player unit (MPU) 1 and a unit dispenser kiosk (UDK) 2. Specifically, FIG. 1 shows three mobile player units 1 located outside dispenser kiosk 2 and fifteen mobile player units 1 located inside kiosk 2. It is presumed that mobile player units 1 located outside of kiosk 2 are rented to players and that the units 1 located inside kiosk 2 are generally available for rent. The rented units 1 are shown with their touchscreen liquid crystal displays (LCD) 3 facing the reader and with their radio-frequency (RF) antennae 4 extended, whereas mobile player units 1 inside kiosk 2 are shown positioned on their sides 5 with antennae 4 retracted into respective units 1. FIG. 1 also illustrates that MPU 1 is equipped with control pushbuttons 6, a charger and communications connector 7 and a "UNIT READY" light emitting diode (LED) 8. LCD 3 of a first rented unit 1 displays an image of a bingo card, while LCD 3 of a second rented unit 1 displays an image of slot reels, and LCD 3 of a third rented MPU 1 displays an image of poker cards. Although only a few mobile player units 1 are shown in FIG. 1, a typical casino is expected to have hundreds of rental MPU 1 available for its patrons and is expected to be equipped with several UDKs 2 networked together.

Being a combination kiosk-type dispenser of MPUs 1 with a central game controller, UDK 2 includes an assortment of conventional point-of-sale and automatic-teller-machine components, including a touchscreen video monitor 9, a receipt printer (PRT) 10, a magnetic card reader (MCR) 11, a bill validator/barcode-reader (BV) 12 a bill dispenser (BD) 13 and a coin dispenser CD 14. In addition, UDK 2 incorporates a RF antenna 15 being a part of an embedded RF transceiver 16 shown explicitly in FIG. 2. The UDK 2 includes a plurality of storage cells 17. Each storage cell 17 is capable of housing one MPU 1. In addition, each storage cell 17 is capable of recharging and communicating with the MPU 1 housed therein. Specifically, FIG. 1 shows thirty cells 17 arranged in three rows of ten cells 17 each. Some illustrated cells 17 are occupied by units 1 and some cells 17 are empty as some MPUs 1 have been rented. Although FIG. 1 explicitly shows only thirty storage cells 17, a typical UDK 2 may incorporate more or less than thirty cells 17.

Figure 3:
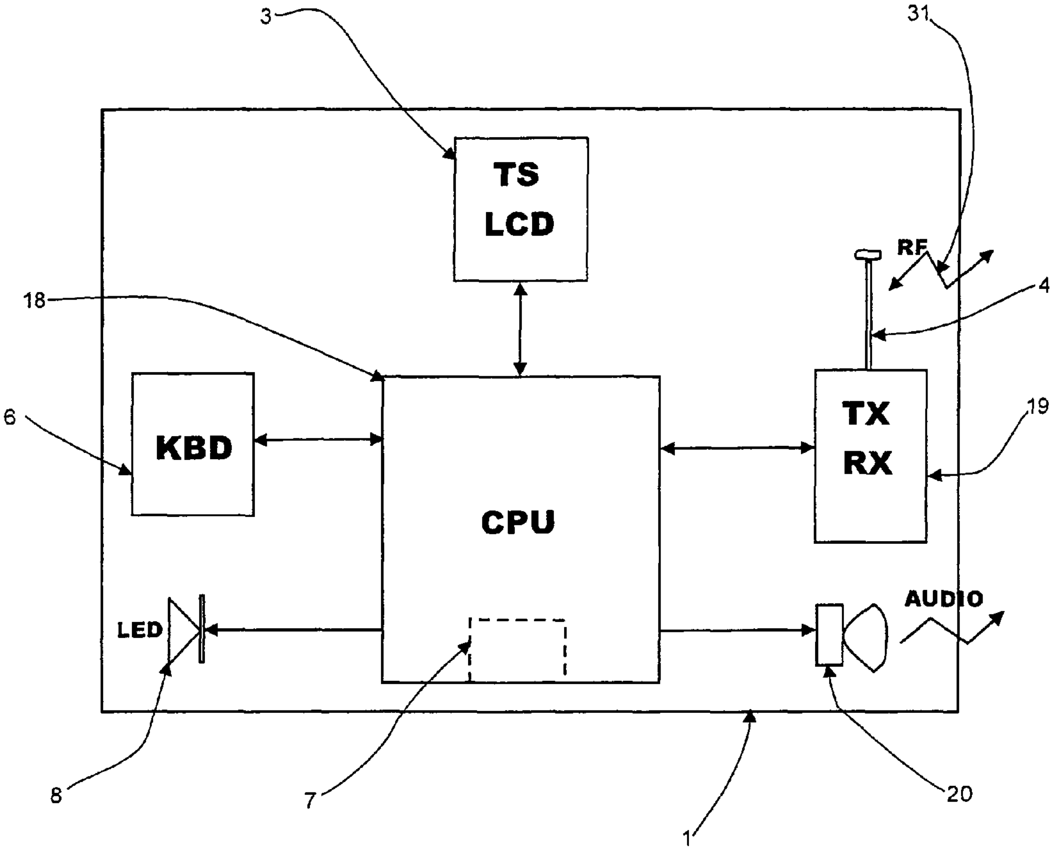
FIG. 3 illustrates a block diagram of a player unit of the present invention.

The internal design of an MPU 1 is illustrated in FIG. 3. Being essentially a wireless PDA, MPU 1 incorporates touchscreen LCD 3, antenna 4, LED 8, connector 7, control buttons 6, a programmable microprocessor 18, such as a DragonBall-Z® microprocessor, a spread-spectrum RF transceiver

19, such as a BlueTooth® transceiver and a speaker 20. Also incorporated within the internal design of an MPU 1, but not shown explicitly in FIG. 3, are conventional dynamic and non-volatile memory and a rechargeable battery.

Figure 2:
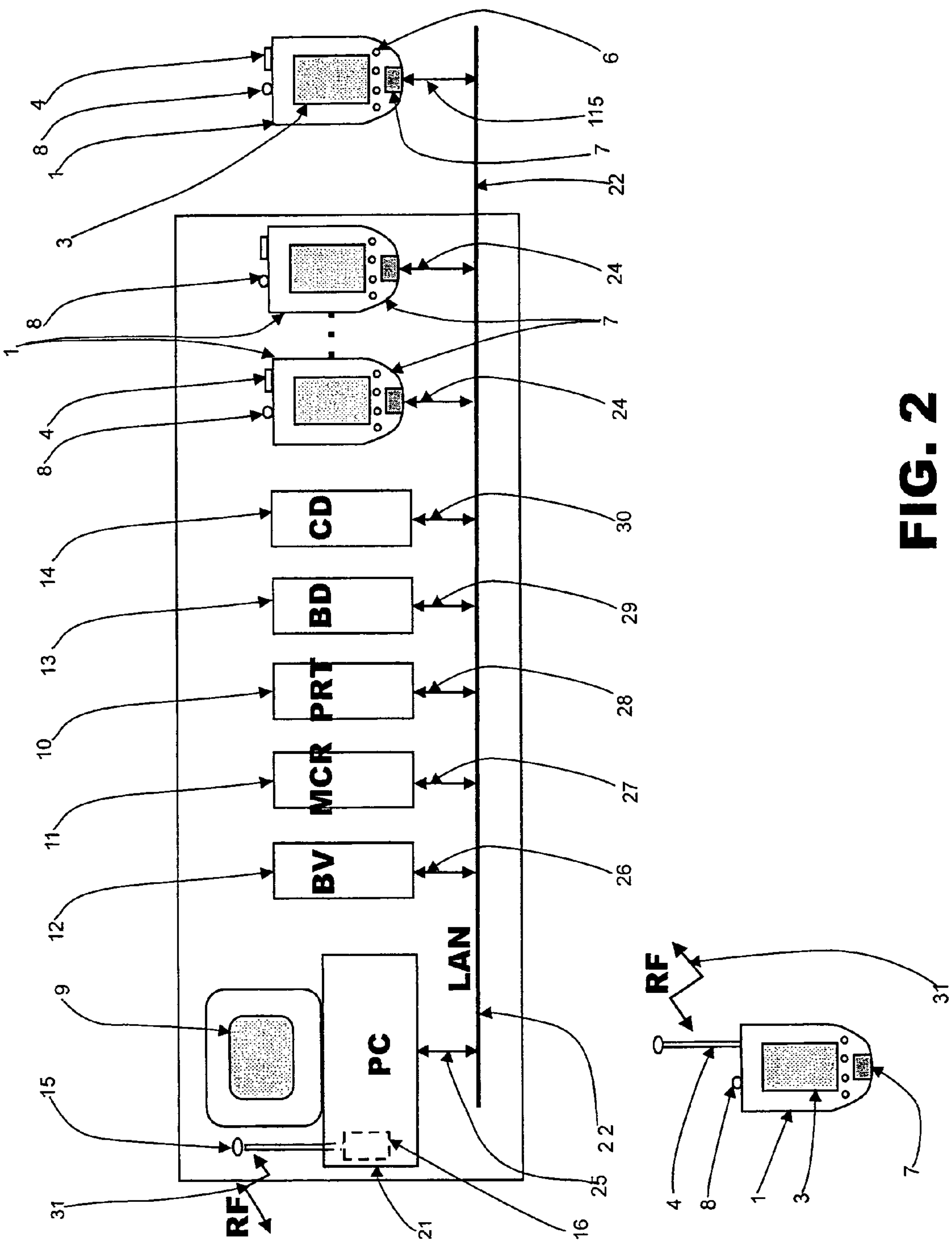
FIG. 2 illustrates a local area network of the present invention.
Figure 4:
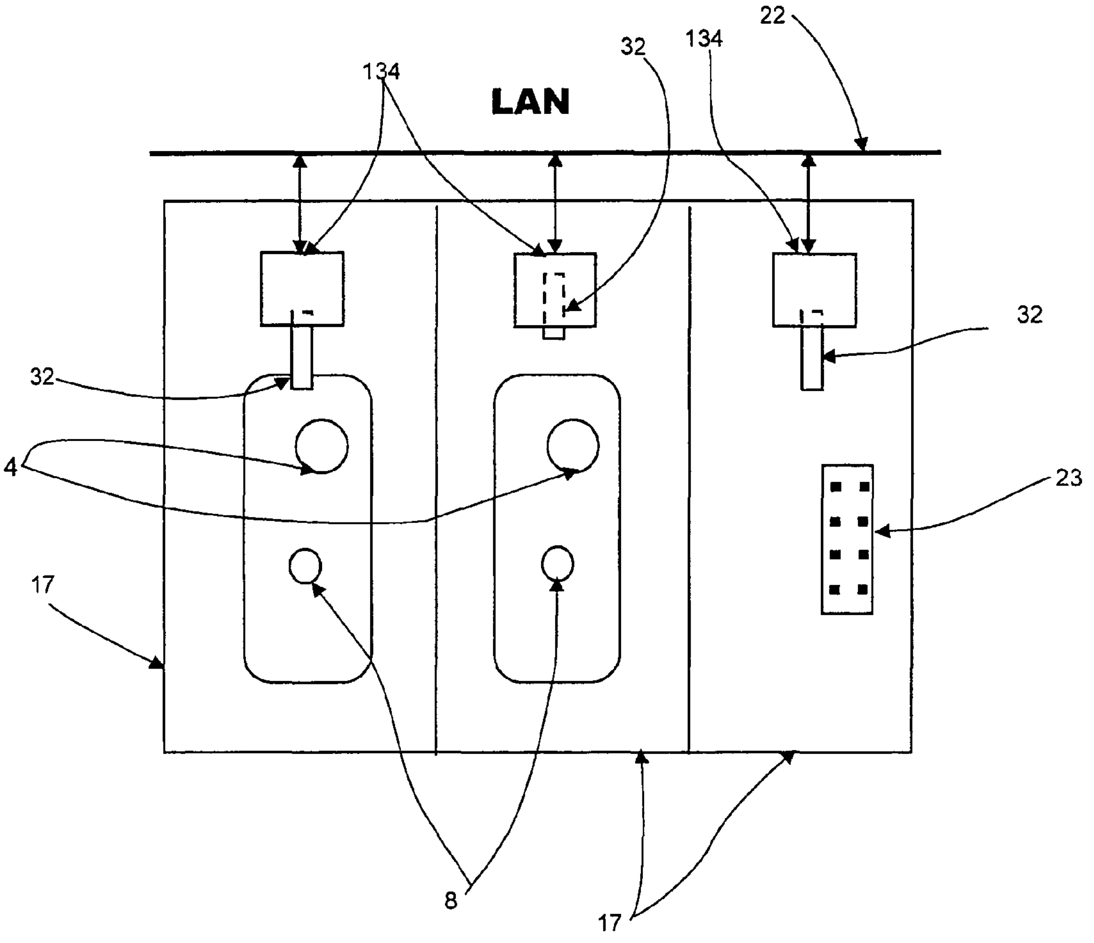
FIG. 4 illustrates a locking mechanism of the present invention.

The internal design of UDK 2 is detailed in FIG. 2. Architecturally, UDK 2 is a local area network (LAN) 22 governed by a conventional personal computer (PC) 21. The internal components of UDK 2 are interfaced with each other via LAN 22. In particular, PC 21, BV 12, MCR 11, PRT 10, BD 13, and CD 14 are permanently plugged into LAN 22. An MPU 1 temporarily occupying cell 17 is interconnected with LAN 22 via its own connector 7 and a mating charging and communication connector 23 on the end of cable 24 that forms a branch of LAN 22. Connector 23 is built into cell 17 as shown in FIG. 4. LAN 22 also includes cables 25 through 30 forming branches of LAN 22 interfacing respectively with PC 21, BV 12, MCR 11, PRT 10, BD 13 and CD 14. In addition, LAN 22 is wirelessly interfaced with rented MPUs 1 via a spread-spectrum RF channel 31, preferably, a public domain RF channel. More specifically, PC 21 incorporates a spread-spectrum transceiver 16 (shown in dashed lines) identical to the spread-spectrum transceiver 19 of MPU 1 and an antenna 15 identical to the antenna 4 of MPU 1. Via transceivers 16 and 19 and antennae 4 and 15, LAN 22 is wirelessly interfaced with MPU 1 over a spread-spectrum RF channel 31.

FIG. 4 illustrates three neighboring cells 17 of UDK 2. The leftmost cell 17 and the central cell 17 are occupied by MPUs 1, whereas the rightmost cell 17 is empty. As shown in FIG. 4, each storage cell 17 includes a battery charger and communications connector 23, for mating with connector 7 of MPU 1, and an electromechanical lock formed by a spring-loaded solenoid 134 (the spring is not explicitly shown in FIG. 4.) having a solenoid rod 32. The leftmost cell 17 shows solenoid 134 in a deactivated state with its rod 32 being forced out by the spring and, consequently, MPU 1 being locked inside the leftmost storage cell 17. The central storage cell 17 shows solenoid 134 in an active state with its rod 32 retracted and, consequently, MPU 1 being released. The mechanics of solenoid 134 are such that its rod 32 allows for easy insertion of MPU 1 into cell 17 but precludes removal of MPU 1 from cell 17 without activation of solenoid 134. Although not shown explicitly, each storage cell 17 also includes charging circuitry for charging MPU 1 while it is inserted into storage cell 17.

Via LAN 22, PC 21 periodically polls all cells 17 of UDK 2 to determine whether they are occupied and, if so, by which MPU 1. Note that each MPU 1 is characterized by its unique manufacturer's identification number 33 stored in its non-volatile memory and further etched on the top surface 34 of MPU 1 as shown in FIG. 1. In particular, PC 21 periodically sends a test data block to each occupied cell 17 via respective communication connectors 23 and 7. In response to the received test block, MPU 1 residing in a particular cell 17 sends an acknowledgment containing its manufacturer's identification number 33 to PC 21 via embedded connector 7. The conventional details of the test and acknowledgment data blocks flowing between MPU 1 and PC 21 are omitted herewith as they are well known to practitioners of the art. Once PC 21 receives a positive acknowledgment from MPU 1, it marks, in its memory, the respective cell 17 together with MPU 1 residing therein as available for dispensing to a player. Specifically, PC 21 maintains in its memory a status table 35 illustrated in FIG. 5. The status table 35 details the current status of each cell 17, each MPU 1 and each casino patron renting an MPU 1. Each row of table 35 presents status of an individual cell 17. Specifically, the first group 36 of thirty rows represents the current status of thirty individual cells 17. The individual cells 17 in table 35 are indexed by the cell identification number 37. The top leftmost cell 17 of FIG. 1 is identified as cell number one (1) and the bottom rightmost cell 17 of FIG. 1 is identified as cell number thirty (30). For each storage cell 17, table 35 indicates the manufacturer's identification number 33 of mobile player unit 1 housed therein and the current status 38 of MPU 1 located in the cell 17. The current status of each MPU 1 stored in a cell 17 is indicated by status flag 38 that is equal to one, if respective cell 17 houses an MPU 1 ready for dispensing, and is equal to zero otherwise.

Figure 6:
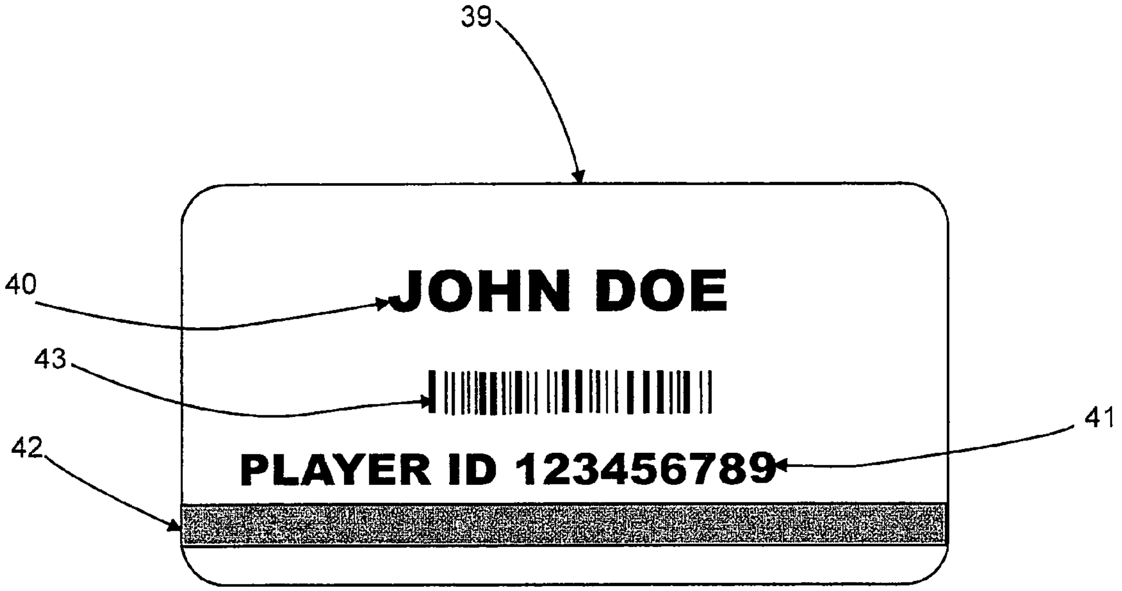
FIG. 6 illustrates a player-tracking card of the present invention.

Players rent MPUs 1 from UDK 2 and return MPUs 1 to UDK 2 once they complete playing. In order to rent an MPU 1 from UDK 2, a player is preferably required to first insert into MCR 11 a player tracking card 39 as illustrated in FIG. 6, otherwise no MPU 1 should be dispensed by UDK 2 to the player. Along with a player's name 40, card 39 bears a player's identification number 41. For purposes of brevity, a player having identification number 41 may simply be called player 41 throughout the remainder of the disclosure. The name 40 and identification number 41 may also be encoded in a magnetic form on magnetic strip 42 and may also be available in a barcode format 43. In order to rent a player unit, a player must, in addition to inserting player card 39 into MCR 11, also deposit money into BV 12.

Figure 7:
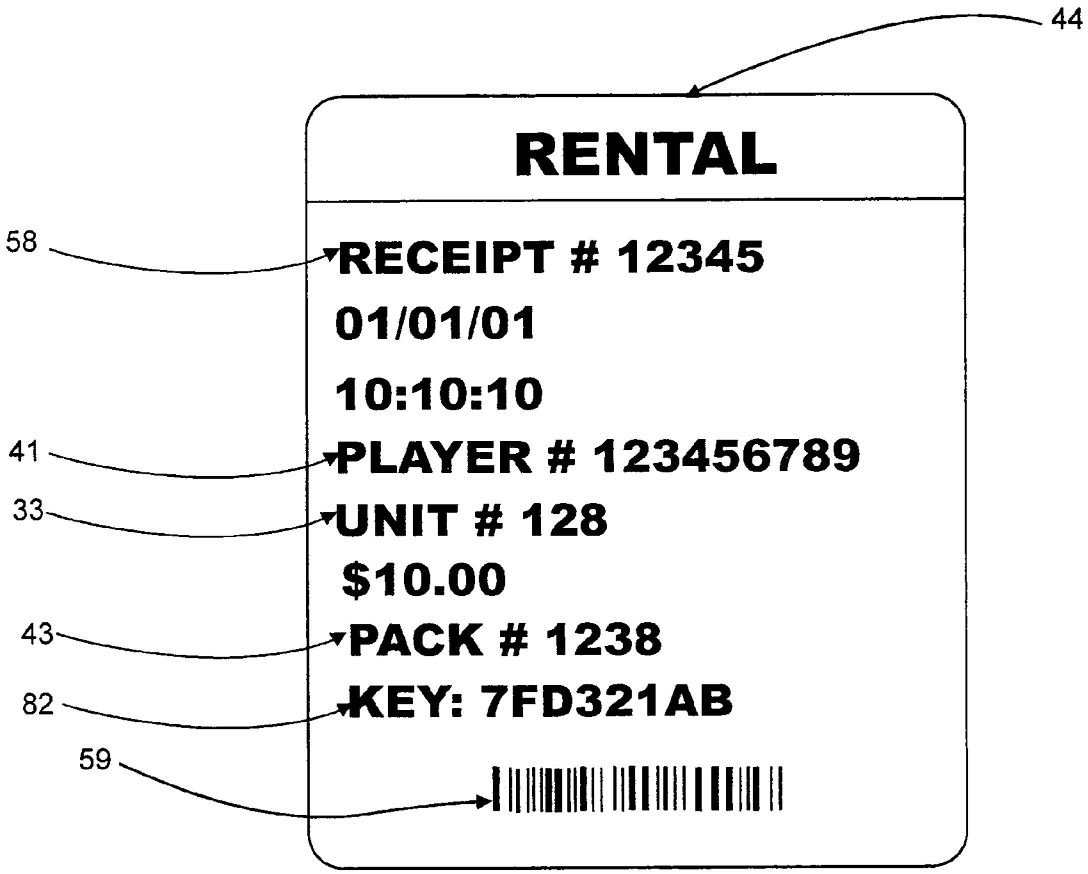
FIG. 7 illustrates a rental receipt of the present invention.

While the present invention is adapted to playing any casino game, in order to facilitate the description of the operation of the system, a simple case of a player renting an MPU 1 to play a prepackaged set of electronic bingo cards ("pack") is considered. For example, it is assumed that a casino offers players only one type of bingo packs and allows players to buy only one pack. A specific bingo pack sold to a player 41 is identified on a rental receipt 44 issued by PRT 10 as illustrated in FIG. 7. Note that manufacturers of paper and electronic bingo packs design their packs in such a way that each bingo pack contains predetermined bingo cards and each bingo pack is identifiable by its manufacturer's pack identification number 100. To determine each and every bingo card to be played by player 41 in each and every bingo game of a bingo session for which pack 43 is intended, it is sufficient to know the pack identification number 100. The reverse is also true where duplicate bingo cards are not allowed in any game.

Figure 8:
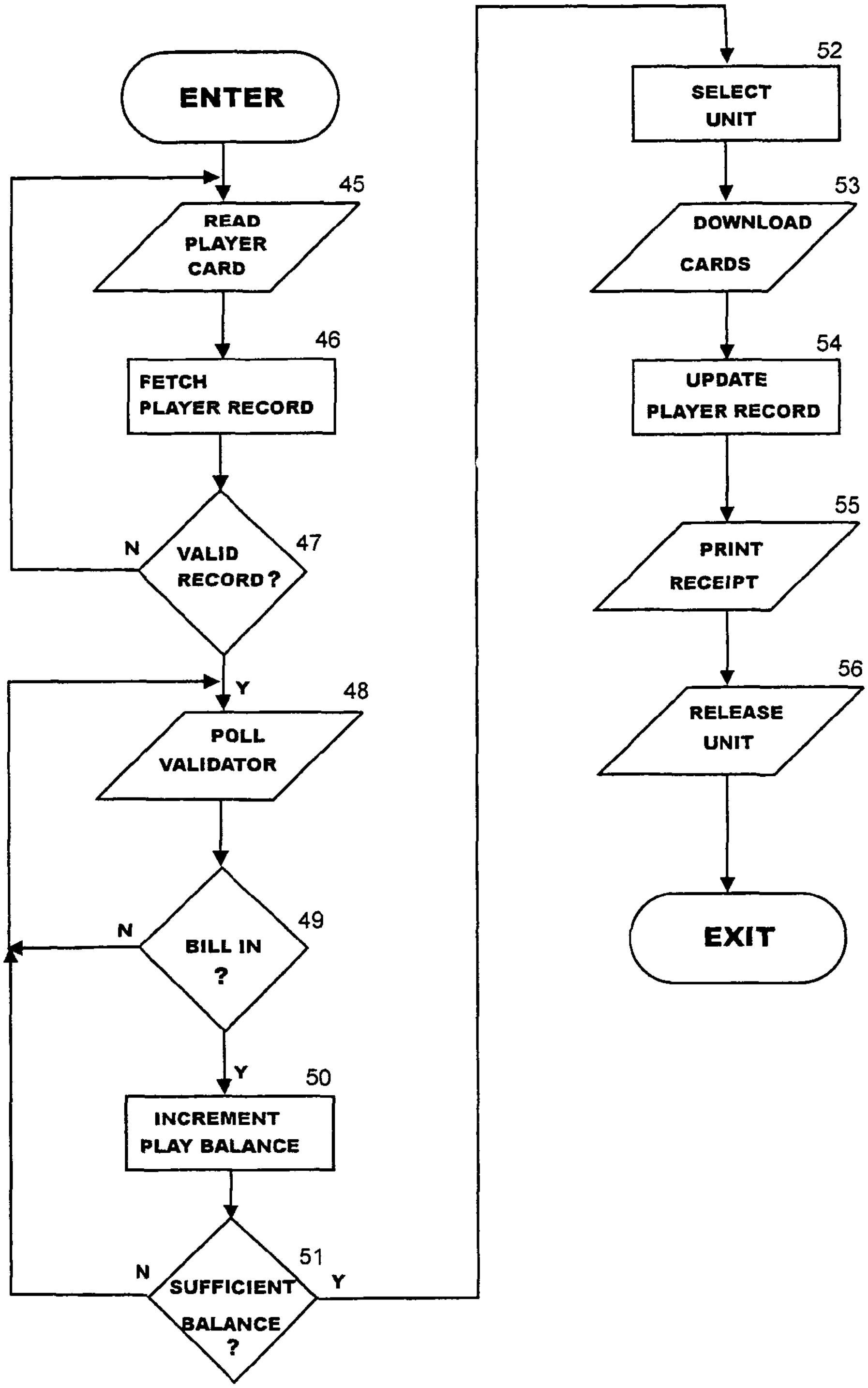
FIG. 8 illustrates a flowchart of a "dispense unit" task of the present invention.

The operations being performed by PC 21 of UDK 2 in this simplified case are illustrated in the flowchart of FIG. 8 illustrating a "dispense unit" task. Note that PC 21 operates in a multitasking environment, such as Linux®, and executes multitasking applications software. In accordance with the instructions 120 displayed on the touchscreen monitor 9, a player starts by inserting a player card 39 into magnetic card reader 11. MCR 11 detects the inserted player card 39 and transfers a player identification number 33 over LAN 22 to PC 21 as illustrated by the step "READ PLAYER CARD" 45 of the flowchart in FIG. 8. Subsequently in the step "FETCH PLAYER RECORD" 46, PC 21 attempts to fetch the current player record by matching the read-in player identification number 33 from the status table 35. Techniques of searching databases are well known in the industry and, therefore, not described in detail herein. If as a result of the test "VALID RECORD?" 47, a matching record is not found in table 35, PC 21 returns to step 45 of reading player card 39. If test 47 is passed successfully, PC 21 begins to poll BV 12 in step "POLL VALIDATOR" 48. If a bill is indeed inserted, then the test "BILL IN?" 49 is deemed successful, and the player's balance 57 that is stored in status table 35 is incremented according to the denomination of the bill in step "INCREMENT PLAYER's. BALANCE" 50. Assuming the resulting balance 57 is sufficient to purchase a bingo pack, the test "SUFFICIENT BALANCE?" 51 is satisfied and PC 21 proceeds to the next step "SELECT UNIT" 52, otherwise PC 21 loops back to step 48. Excess deposited funds, if any, are credited to player's account balance 57. While performing step "SELECT UNIT" 52, PC 21 scans table 35 and finds the next available MPU 1 ready for operation. The located MPU 1 is downloaded with purchased electronic bingo cards in the step "DOWNLOAD CARDS" 53, as well as a database of authentication/encryption keys sufficient in number to uniquely authenticate each transmission sent during the next round of play (until the unit is placed back into the kiosk). The database of keys is randomly generated by the PC 21 which retains a matching database for looking up each key in sequence. As techniques of downloading electronic player units with bingo cards, authentication keys and/or selection criteria are well known in the industry, they are omitted herein. Instead, it is emphasized that bingo cards, authentication key database and/or selection criteria are downloaded into MPU 1 via a secure, private communication channel formed by connectors 7 and 23. Note that communications via connectors 7 and 23 are not susceptible to interception, whereas communications via public radio channel 31 can be easily intercepted. Alternatively, a secure infrared link may be established within the confines of the UDK 2. Subsequently, PC 21 updates a record of player 41 (more exactly, a player having identification 41) in status table 35 in the step "UPDATE PLAYER RECORD" 54. In particular, PC 21 updates a player's credit balance 57 to reflect the payment for the purchased bingo pack 43 and also links the record of player 41 with the manufacturer's identification number 33 of MPU 1 downloaded with pack 43. At this point, PC 21 causes PRT 10 to print rental receipt 44 including player identification number 41, identification number 33 of the rented MPU 1, identification number of the downloaded pack 43, receipt identification number 58 and receipt identification barcode 59. Barcode 59 uniquely encodes the information printed on receipt 44. PRT 10 prints receipt 44 in a format compatible with the built-in barcode reader of BV 12 so that the BV 12 can read barcode 59. Lastly, PC 21 activates solenoid 134 of the cell 17 containing the downloaded MPU 1 in the step "RELEASE UNIT" 56 as is illustrated by the central cell 17 in FIG. 4. Now, a player can remove MPU 1, carrying the downloaded information, from a respective cell 17. In order to assist the player in finding the MPU 1, the MPU 1 starts blinking its LED 8 as soon as it detects the end of the process of downloading of, via connectors 7 and 23, pack 43 by PC 21.

Once player 41 removes MPU 1 from UDK 2, PC 21 transfers the identification number 33 of the removed MPU 1 from the first 30 rows 36 of table 35 to the group of records 70 that lists "homeless" MPUs 1 (i.e., units not housed in any specific cell 17 and, presumably, located somewhere on the casino floor). As illustrated in FIG. 5, each "homeless" unit listed in group 70 however is "temporarily owned" by a specific player 41 and vice versa each player 41 becomes linked by PC 21 with a specific MPU 1 having a specific identification number 33. Note that the last group of records in table 35, namely group 133, is essentially a player club database that stores a player's remaining balances 57 and bonus points 68 once the player returns a MPU 1 to UDK 2. While it is advantageous to utilize an automated type kiosk system, it is noted that use of the authentication and encryption invention herein is not limited to automated dispensing systems. Such a system is just as readily applicable to more traditional "point of sale" terminals where a cashier handles the transaction face-to-face with the player. Nor is the system limited to the game of bingo. MPUs may be adapted to play any casino game, and even multiple games concurrently. See U.S. Pat. No. 4,856,787 to Itkis et al.

Figure 9:
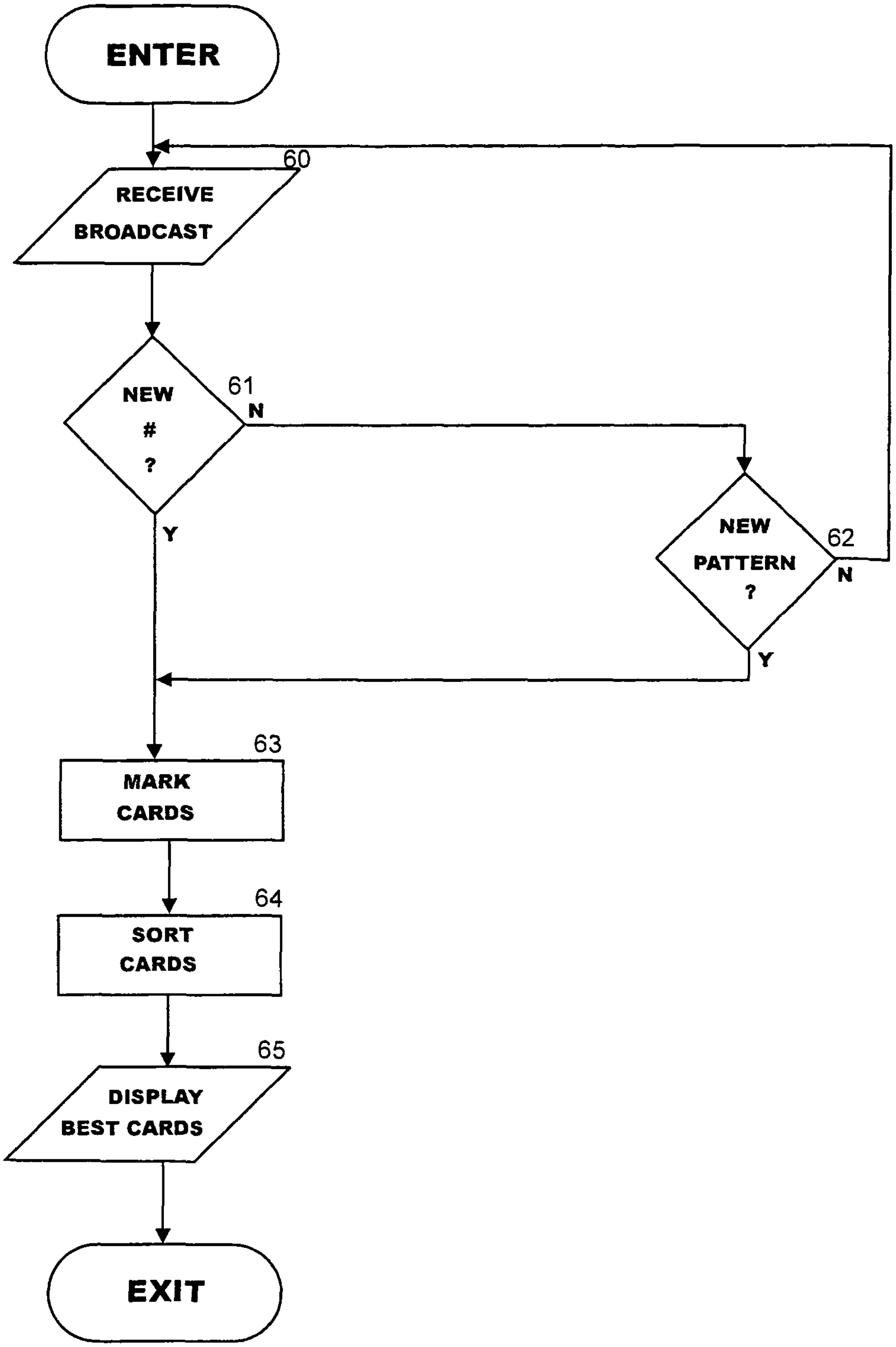
FIG. 9 illustrates a flowchart of a "verify" task of the present invention.

Once removed from UDK 2 (or issued by a cashier), a player can carry a rented MPU 1 anywhere through a casino and, as long as MPU 1 receives bingo data over RF channel 31, it will play bingo automatically as illustrated in the flowchart of FIG. 9 illustrating a "verify" task. Specifically, in the step "RECEIVE BROADCAST" 60, MPU 1 receives bingo data, such as called bingo numbers and bingo patterns, broadcast by UDK 2 to all MPUs 1 via antenna 15. Note that the broadcast data does not have to be encrypted because it is not necessary to encode publicly known data, such as called bingo numbers and bingo patterns being played. In particular, MPU 1 checks for new called bingo numbers in the test step "NEW #?" 61 and for new bingo pattern in the test step "NEW PATTERN?" 62. Should any new data be discovered, MPU 1 marks electronic bingo cards in its memory in accordance with the received new data in the step "MARK CARDS" 63. Otherwise, MPU 1 loops back to step 60. Once MPU 1 marks cards, it sorts the marked bingo cards in accordance with their closeness to winning and displays the best bingo cards on its screen 3 in the step "DISPLAY BEST CARDS" 65. In particular, if MPU 1 detects a card that achieved bingo, MPU 1 immediately displays the winning card 66 on touchscreen 3 and continuously blinks card 66 to attract a player's attention. In addition, MPU 1 may play a winning tune through speaker 20.

The data broadcast by UDK 2 over antenna 15 originates at PC 21. PC 21 stores a schedule of bingo games or patterns to be played in its memory in a conventional way. PC 21 also utilizes a standard random number generation utility to generate randomly called bingo numbers. As an alternative, a conventional ball hopper or bingo rack may be used to generate random bingo numbers. PC 21 also automatically verifies all sold bingo cards (i.e., bingo cards downloaded in each rented MPUs 1), with each new called bingo number in order to detect a winning card as taught by U.S. Pat. No. 5,951,396 to Tawil and is further disclosed in applicants' copending U.S. patent application Ser. No. 60/241,982 entitled "Fully Automated Bingo Session." Once a winning card is detected, PC 21 algorithmically computes the identification number 100 of bingo pack 43 that the winning bingo card was downloaded to. Knowing the winning pack number 43, PC 21 finds the winning player corresponding to the manufacturers identification number 33 by searching status table 35. Once the winning player is found, PC 21 updates the player's balance 57 to reflect the winning prize.

Figure 10:
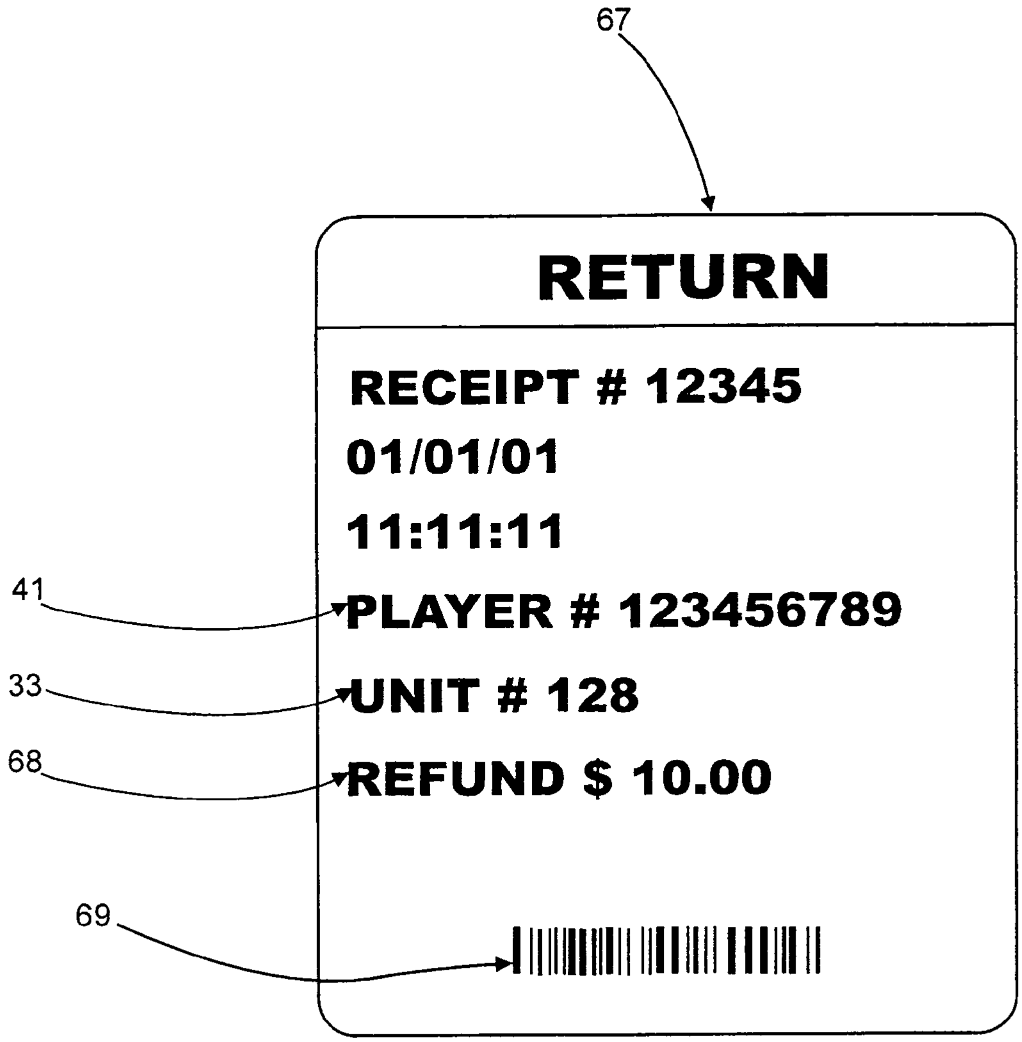
FIG. 10 illustrates a return receipt of the present invention.

Meanwhile, the winning MPU 1 independently detects a winner as described above and starts blinking the winning card 66 on display 3 and optionally plays a winning tune through speaker 20. At this point, a winning player may approach UDK 2 and claim a prize by inserting the winning MPU 1 back into UDK 2. A player may insert MPU 1 into any empty cell 17. PC 21 detects the insertion of MPU 1 through cell 17 polling procedure described above. Upon learning the physical identification number 33 of the inserted MPU 1, PC 21 searches status table 35 and fetches the identification number 41 of the player who rented the unit and also fetches the player's account balance 57 from table 35. The account balance 57 includes the player's winnings as described above. Now PC 21 causes BD 13 and CD 14 to dispense the player's balance due. Specifically, BD 13 dispenses the dollar amount of the player's balance 57 and CD 14 dispenses the remaining amount, if any, of cents in coins. Once dispensing of the balance 57 is complete, PC 21 clears balance 57 in player's 41 record in table 35 and also clears MPU 1 manufacturer's identification field 33. The operation of clearing field 33 releases player 41 from any responsibility for the returned MPU 1. As a courtesy to the player, PC 21 also causes PRT 10 to issue a return receipt 67 illustrated in FIG. 10, wherein 68 is the refund value, if any, and 69 is the barcode that uniquely identifies and verifies return receipt 67.

Optionally, a player may also be required to insert the barcoded receipt 44 into BV 12 and/or insert the player card 39 into magnetic card reader 11. If such an option is selected, then BV 12 reads barcoded identification 59 of receipt 44 and/or magnetic card reader 11 reads-in player identification number 41 from card 39, and PC 21 compares read-in identifications 59 and/or 42 of receipt 44 and/or card 39 with the values stored in table 35. Assuming they match with the read-in identification 33 of MPU 1 stored in the player's 41 record in table 35, the validity of the winning claim is well-established. Some casinos may even elect to rely exclusively on the validation of receipt 44 and/or card 39 for purposes of paying winners without the requirement of returning the winning MPU 1 into UDK 2. However, the preferred requirement of returning the winning MPU 1 decreases the casino's labor costs since casino employees will not have to retrieve and return MPUs left all over the casino. Also, it insures that MPUs 1 are readily available for new players to rent. Moreover, it prevents a player from taking a MPU 1 home as a "souvenir" or the like. For all such reasons, it makes sense for a casino to require all players to return all rented MPUs 1 to UDK 2 once a player is finished. A casino is in a position to enforce the return of the MPUs 1 because status table 35 contains detailed records of MPUs 1 rented by players. However, instead of enforcing the return of MPU 1, a casino may encourage a voluntary return by, for example, awarding a player's account bonus points 68 upon the return of the rented MPU 1. A player may use the bonus points 68 as discounts for buffets, souvenirs, etc. Also, a casino may impose a deposit fee for renting MPU 1 and refund the deposit to the player through dispensers 13 and/or 14, once a player returns the MPU 1.

The primary reason the above-described MPU 1 is equipped with RF-channel 31 is to facilitate automatic playing of bingo on the casino floor. However, some players and some casinos prefer manual entry of all necessary bingo data into the MPUs 1 as described, for example, in U.S. Pat. No. 4,378,940 to Gluz et al., and the article "Bingo Playing Enhanced With New Innovations", Bingo Manager, July, 2001. If manual entry is required, the MPU 1 does not have to be equipped with transceiver 19 and antenna 4 resulting in a less expensive MPU 1. However, even in such a simplified case, the UDK 2 is still very useful since it completely automates the process of selling electronic bingo cards and yields substantial labor costs savings for casinos and bingo halls.

Figure 11:
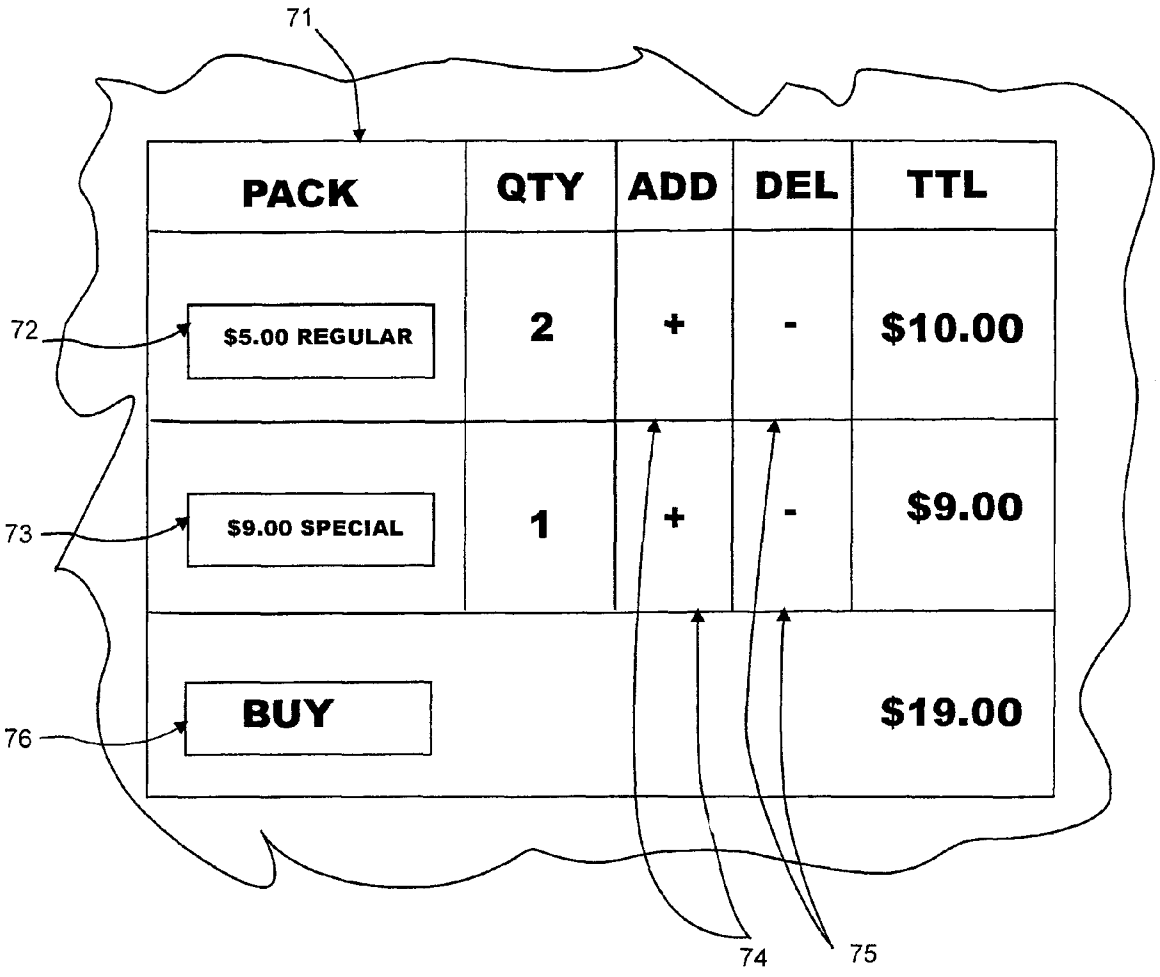
FIG. 11 illustrates a "buy pack" window of the present invention.

The aforementioned simple example of the system illustrated in FIG. 1 presumes that a player purchases only one specific bingo pack 43. However, being equipped with touchscreen 9, UDK 2 can offer a player a choice of types and quantities of packs as illustrated in FIG. 11 showing a window 71 on touchscreen 9. Window 71 displays an example of a menu of choices available to the player. Specifically, by touching button 72, a player can select a "REGULAR" pack costing $5.00 and by pressing button 73, a player can select a "SPECIAL" pack costing $9.00. Touchbuttons "+" 74 and "−" 75 allow a player to increase and decrease respectively the number of packs to purchase. Finally, touchbutton "BUY" 76 allows a player to actually place a purchase order. Each transmission from the player's unit to the UDK 2 is accompanied by an authentication key. The key may take the form of an encryption key whereby each transmission is encrypted and authenticated as well. After authenticating and, if necessary, decrypting a signal for a purchase order, PC 21 processes the player's purchase order in a conventional manner.

Figure 12:
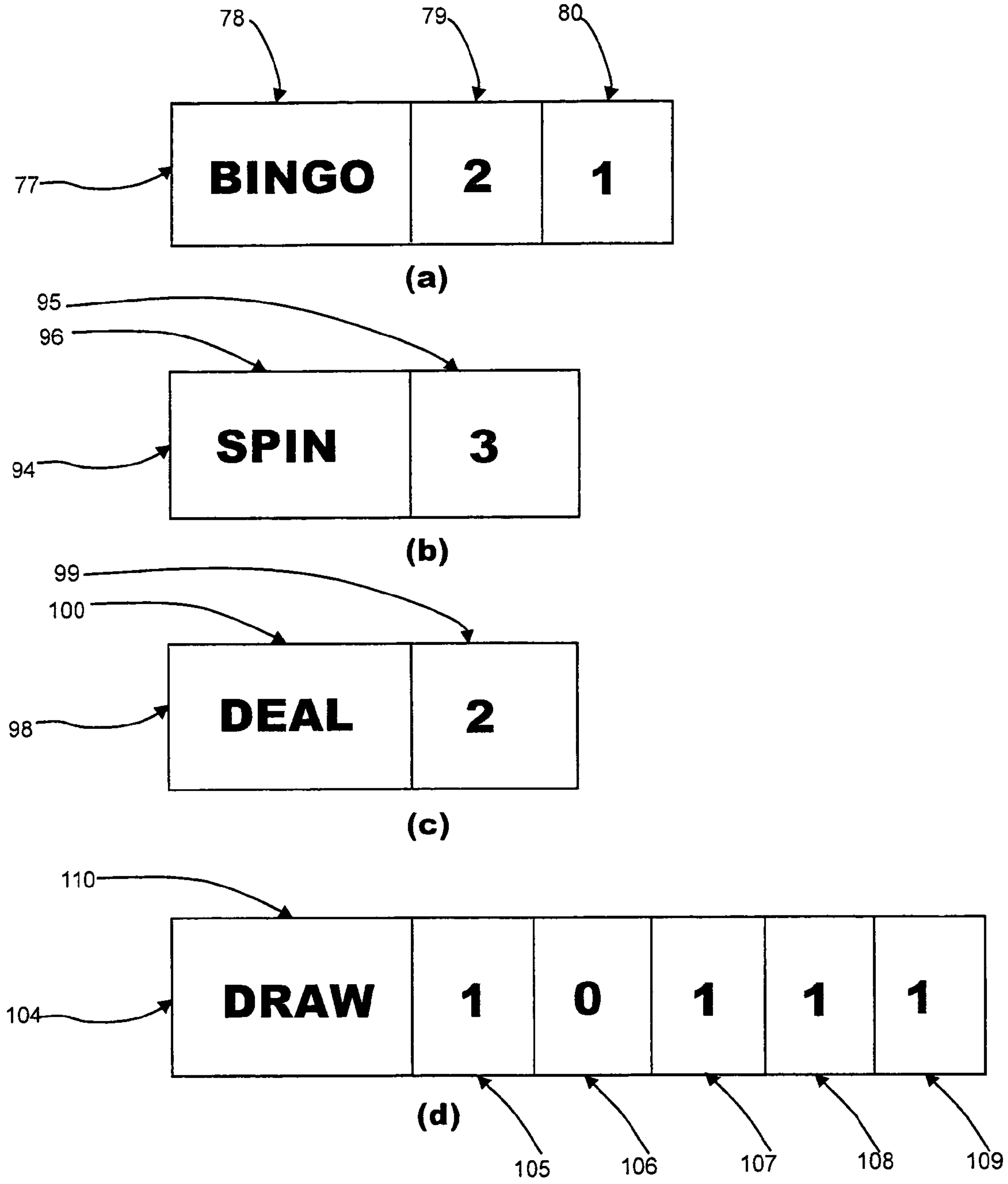
FIG. 12 (*a*) illustrates a "bingo request" data block of the present invention.

To this point, it was assumed that bingo packs 43 are to be purchased by the player at the UDK 2 when the player rents MPU 1. This is acceptable in the case of bingo games organized in sessions of one hour or more. However, in the case of so-called continuous bingo wherein players buy bingo cards for each game separately and may, for example, play some games while skipping other games, it is inconvenient for a player to buy bingo cards at UDK 2 separately for each game. It is therefore desirable to allow a player to purchase bingo packs on the casino floor, through MPU 1 that has an inherent capability of two-way radio communication via transceiver 19. For example, touchscreen 3 of MPU 1 can display the same menu 71 illustrated in FIG. 11 as the touchscreen 9 of UDK 2. Once a player completes the purchase order by pressing "BUY" button 76, MPU 1 can send a request to purchase electronic bingo cards to UDK 2 via RF channel 31. In particular, MPU 1 can send a "bingo request" data block 77 illustrated in FIG. 12(*a*) wherein, a data field "BINGO" 78 signifies that the present request is to purchase bingo packs, the next field 79 specifies the number of regular packs to purchase and the last field 80 specifies the number of special packs included in the purchase. Upon receiving a purchase request 77 from MPU 1, PC 21 fetches from status table 35 a record corresponding to the identification number 33 of MPU 1 and checks the current account balance 57 of the player for sufficiency of funds to cover the request 77. Assuming sufficient funds are available, UDK 2 transmits purchased electronic bingo cards to MPU 1 via RF channel 31 rather than downloading purchased bingo cards via connectors 7 and 23. PC 21 also decrements account balance 57 by the amount of the order.

However, there is a serious concern with the direct two-way RF communication between MPU 1 and UDK 2. Specifically, such a communication over open RF channel 31 can be easily intercepted. The lack of security can be resolved by encrypting such communications with the help of private encryption keys that are generated by UDK 2 and downloaded into MPU 1 via a secure route formed by connectors 7 and 23. Specifically, in addition to, and/or instead of bingo cards, PC 21 can download MPU 1 with at least one random digital security key to secure the two-way radio communications between MPU 1 and UDK 2. Such a digital security key is typically known in the industry under a variety of names (e.g., a digital encryption key, DES key, an authentication key, a private key, a digital signature key, a hashing algorithm, etc.). As will be more fully explained, it is advantageous to download a multiplicity of authentication and/or encryption keys in an indexed database so that each transaction may be authenticated with a unique key. Importantly, MPU 1 is downloaded with new encryption keys each time MPU 1 is rented (for each "round" of play) and, therefore, even if the same player 41 accidentally rents the same MPU 1 having the same identification number 33, the downloaded encryption keys are different every time.

Figure 13:
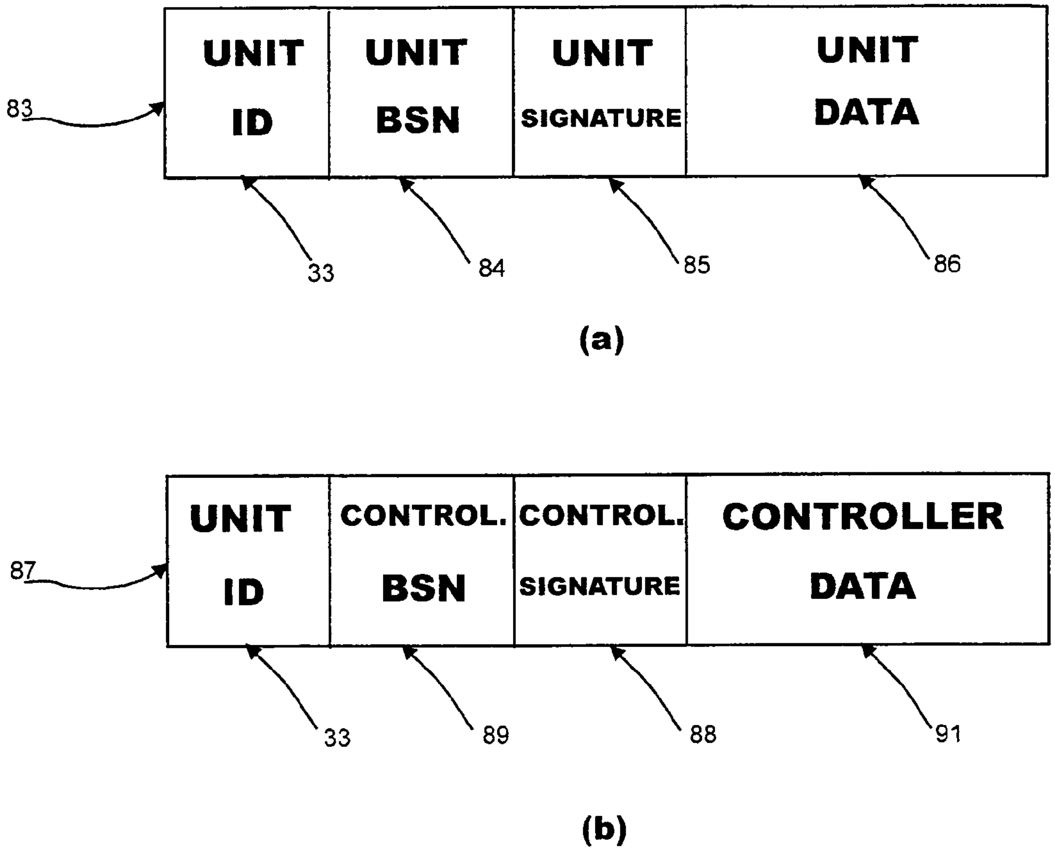
FIG. 13 (*a*) illustrates a "service request" data block of the present invention.

In the preferred embodiment, a multiplicity of random authentication and/or encryption keys 82 generated by PC 21 with the help of random number generation software utility in a conventional way. The details of the generation and utilization of each key 82 are omitted herein since techniques of data authentication and encryption are well known in the industry and are disclosed in numerous publications including, for example, U.S. Pat. Nos. 4,670,857 to Rackman, 5,643,086 to Alcorn et al., 6,071,190 to Weiss et al., and 6,149,522 to Alcorn et al. See also See e.g., Schneider supra. Instead, it is re-emphasized that PC 21 downloads MPU 1 with a database of security keys 82 over a secure communication channel formed by cable 24 and connectors 7 and 23 and that the contents of the security key database changes with every downloading. Note, the structure of the database itself is not illustrated as it can take the form of a wide variety of database structures well known in the art. The database simply and typically would contain the multiplicity of authentication keys and an index. Being downloaded with a multiplicity of data security keys 82 in a security key database, MPU 1 can send different authenticated data blocks to UDK 2 over the public radio frequency channel 31 for each transaction. Specifically, each such data block is authenticated with the help of a digital signature based on a security key 82 as illustrated in FIG. 13. Similarly, each data block MPU 1 receives from UDK 2 over the public RF channel 31 is also authenticated with the help of a digital signature taken in sequence from the security database as illustrated in FIG. 13. The order in which keys are used may be inherent in the database. However, in the preferred embodiment, to further protect the transactions, the order in which each key is selected from the database may be determined by an algorithm which is downloaded at the same time as the database over a secure channel. The algorithm may be an encrypted sequence which is changed for each download event. Optionally, the database of keys may be generated by the central computer and communicated to the MPU during the secure download process, or the keys may also be constructed from data partly coming from the central computer (perhaps via the UDK) and partly from the MPU. By changing the database of keys each time the central computer is connected to the MPU via a secure link, the database becomes a de facto "one time pad" (or "Vernam cipher"), considered a completely unbreakable symmetric cipher. See e.g., Schneider supra at 15-16; see also U.S. Pat. No. 1,310,719 to Vernam. Even if a transmission is intercepted, the authentication or encryption key associated with the transmission will not be used again (or, at least, not in any predictable sequence), and, without a copy of the key database and the selection criteria, there is no way to predict the next authentication key. Therefore, it would be impossible for someone to transmit a fraudulent, yet authenticated signal, and equally impossible to support an accusation that such a fraud had been accomplished. This avoids the problem of players demanding refunds on the basis of claimed hijacking of their unit's signals. Because each transmission (e.g., button push, screen touch etc.) uses a different key, this scheme is far more secure than the so called "session key" arrangement in which each "conversation" (i.e., round of gaming) uses a different key. See Schneider supra at 47.

In an alternative embodiment, a pre-defined database of keys may be resident in the player unit. However, the order and/or combination in which the keys are used is changed with each round of play. The key selection criteria are downloaded to the player unit over a secure connection when it is connected to the central computer (via a kiosk or POS computer), at the same time as other sensitive information is downloaded. While this is not as secure as downloading a complete new database of keys for one-time use for each round of play, the download time is greatly reduced, and the level of security is still quite high because, again, there is no way to predict the next key to be used without a copy of the selection criteria.

Specifically, FIG. 13 (*a*) shows a "service request" data block 83 originating at MPU 1 on the casino floor. The data block 83 starts with manufacturer's identification number 33 of MPU 1 followed by a block sequence number 84 followed by a digital signature 85 and ending with a data field 86. Typically, block sequence number 84 is incremented with each new block sent by MPU 1. In the specific case under consideration, data field 86 is a request to purchase bingo cards 77 illustrated in FIG. 12 (*a*). Importantly, authentication field 85 is one of a multiplicity of such keys generated by MPU 1. The keys are predetermined functions of at least one of the fields 33, 84 or 86 using one or more security keys 82 downloaded by PC 21 into MPU 1 over secure connectors 7 and 23. Due to authentication field 85, the entire data block 83 is secure even though some portions of the data block (e.g., 33, 84 and 86) may not be secure. Moreover, each transaction (e.g., key press, screen touch, etc.) uses a different key from the database. Therefore, an unscrupulous player cannot advance a false claim that he or she did not play a particular game that resulted in a loss or that he or she won a large prize since no other player can realistically send out a properly authenticated data block 83 for each and every transaction, since each one requires a different authentication key from a one-time-use "pad." Also, given a sufficiently long authentication field 85 (e.g., five hundred and twelve bits), spurious radio frequency noise cannot realistically produce a false request by a player's MPU 1. Similarly, a "hacker" who does not know the true security keys 82, or the sequence in which they are to be used, cannot send a false game request in the place of a legitimate player. In summary, the casino is protected from false claims that might otherwise be advanced by cheaters and "hackers", and players are more confident that gaming in the casino is fair and secure.

Each response block 87 transmitted by UDK 2 to MPU 1 is also protected by an embedded authentication field 88 as shown in FIG. 13 (*b*) illustrating a "service request" data block. In FIG. 13 (*b*), manufacturer's identification number 33 of an addressed MPU 1 is the destination address of data block 87, 89 denotes a block sequence number assigned by UDK 2 and 91 denotes a data field (e.g., bingo card contents). Only a specific MPU 1 addressed in the field 33 recognizes and authenticates data block 87 since only this specific device was downloaded by PC 21 with a specific digital key 82 matching data block 87 used in a particular transaction. Since each and every transaction in the course of a particular game must be authenticated with a different key previously securely downloaded to the player unit, it is impossible to electronically impersonate another's player unit without having access to the database of keys securely downloaded to the other unit at the beginning of the game. A sufficiently long digital signature 88 virtually guarantees that the outcome of the game shown on touchscreen 3 is correct rather than "hacked" by some prankster.

The above-described technique of secure two-way communication between MPU 1 and UDK 2 over public RF channel 31 with the help of a database of encryption keys 82 downloaded by UDK 2 into MPU 1 over a secure wired channel is useful not only for playing bingo games but is also beneficial for playing "classic" casino games, such as poker, slots and keno. For example, a player can play a slot game on MPU 1 by simply touching touchbutton "SPIN" 92 displayed on touchscreen 3. Once a player touches button 92, MPU 1 causes the image of reels 93 on display 3 to spin and transmits an encoded request 83 having data field 86 structured as "spin request" data block 94 illustrated in FIG. 12 (*b*). The field 95 of block 94 specifies a number of coins the player wagered and the field "SPIN" 96 specifies a request to generate a random final position for the reels 93 to stop. Since MPU 1 is not a per se secure device, the outcome of the game cannot be determined by MPU 1 itself. Only secure PC 21 of UDK 2 can be trusted to generate random numbers on behalf of MPU 1 and thusly determine the prize, if any, won by MPU 1. Upon receiving request 94, UDK 2 randomly generates a new final position for the "reels" 93 and transmits it in an encoded, authenticated form to MPU 1. The MPU 1 decodes the response received from UDK 2 and gradually slows down the "reels" to a new final position determined by UDK 2. Upon pressing a key to initiate another round, the next encryption key previously downloaded to the UDK 2 is used to authenticate the transaction between the UDK 2 and the MPU 1.

Figure 14:
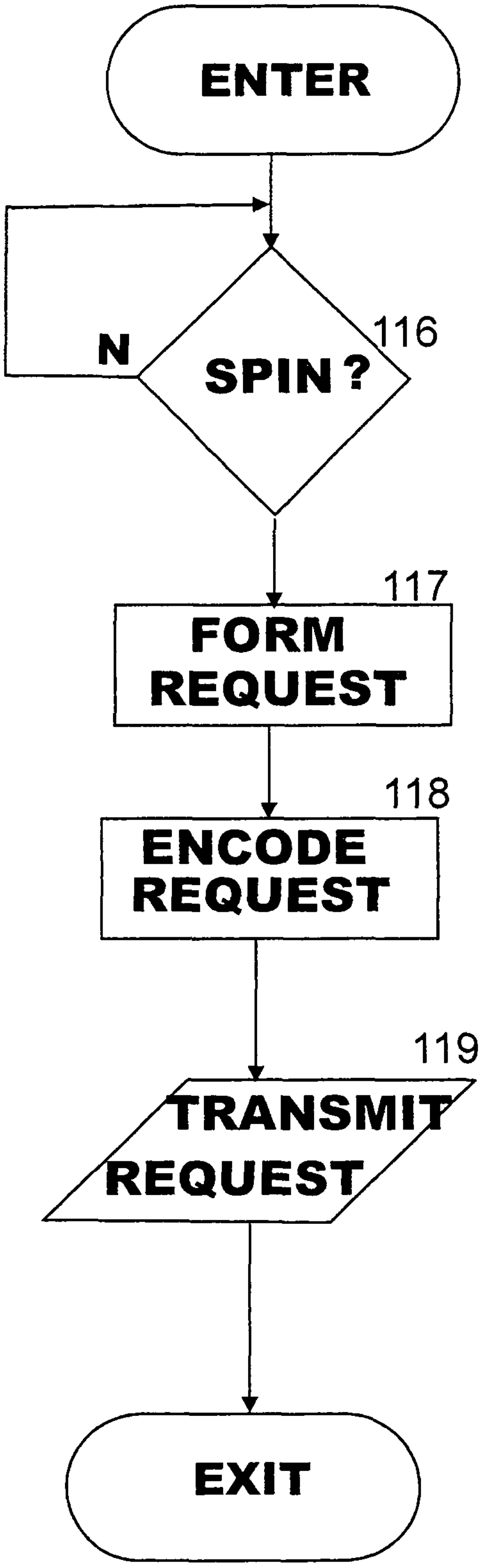
FIG. 14 illustrates a "initiate spin" task of the present invention.
Figure 15:
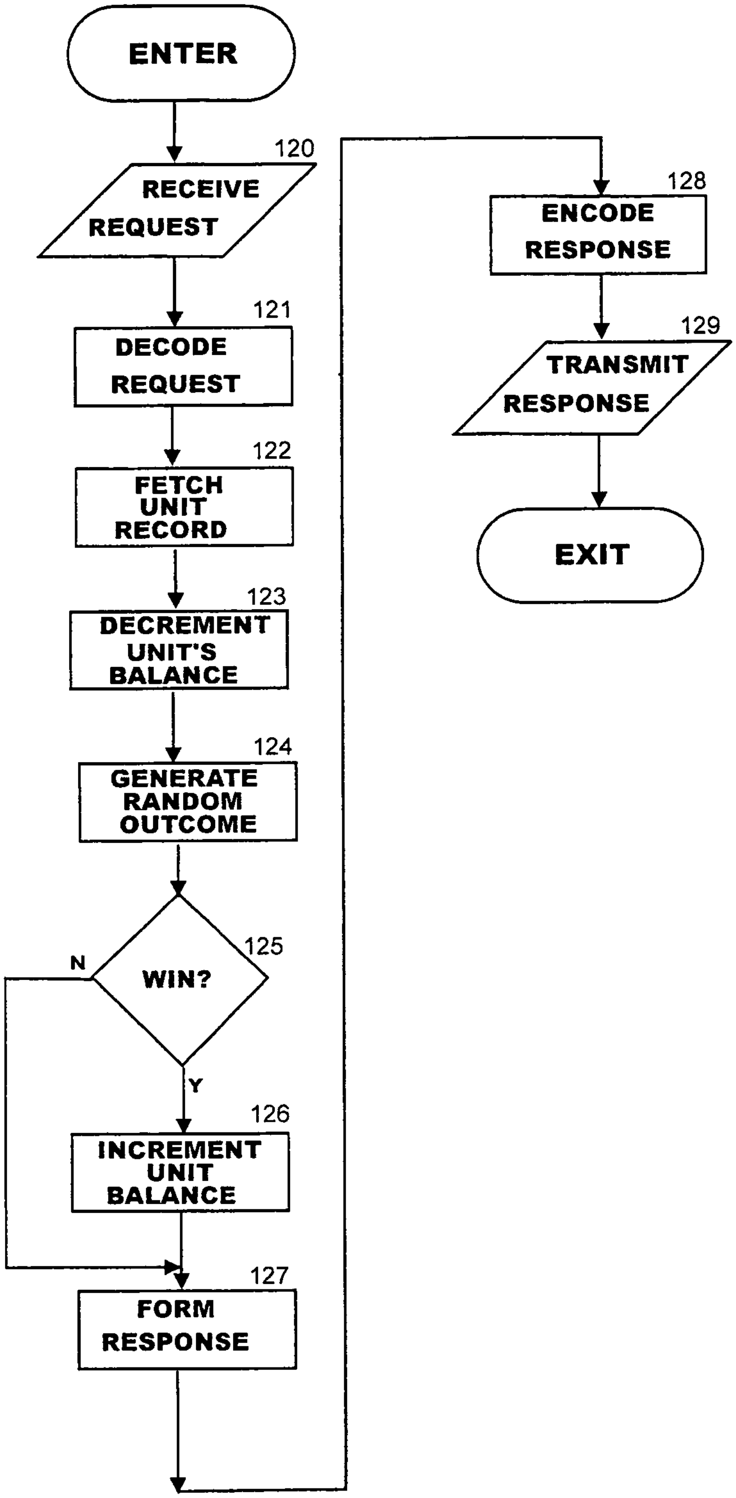
FIG. 15 illustrates a "determine outcome" task of the present invention.
Figure 16:
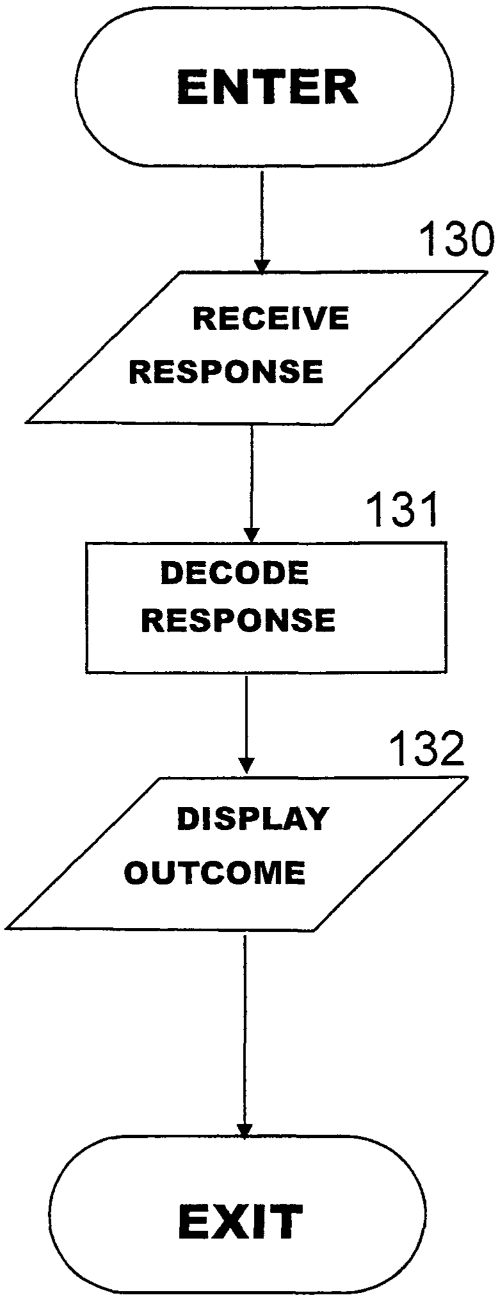
FIG. 16 illustrates a "display outcome" task of the present invention.

The above general outline of events involved in playing slots on MPU 1 is illustrated by flowcharts presented in FIGS. 14 through 16. Specifically, FIG. 14 illustrates the "initiate spin" task performed by MPU 1 in response to pressing push-button "SPIN" 92. Note that similarly to PC 21, MPU 1 also executes a multitasking application program preferably, in Linux® environment. The processing involves a repetitive polling of touchscreen button 92 by the embedded microprocessor of MPU 1 in the step "SPIN?" 116. The polling continues until a pressing of button 92 is detected. Then, MPU 1 forms request 94 in the step "FORM REQUEST" 117. Subsequently, MPU 1 encodes request 94 into block 83 and transmits it via transceiver 19 in the step "TRANSMIT REQUEST" 119. The request 83 sent by MPU 1 is received by UDK 2 and processed by its PC 21 in the step "RECEIVE REQUEST" 120 shown in FIG. 15 that illustrates a "determine outcome" task. Subsequently in the step "DECODE REQUEST" 121, PC 21 decodes the true request 94 from its received encapsulated form 83 using the encryption/decryption key 82 stored in table 35. In the same step "DECODE REQUEST" 121, PC 21 strips out the manufacturer's identification number 33 of MPU 1 that transmitted request 83. Using the decoded manufacturer's identification number 33, PC 21 then performs the step "FETCH UNIT RECORD" 122 by searching group 70 of table 35 for a record matching MPU 1 that transmitted the received request 83. Subsequently, in the step "DECREMENT UNIT's BALANCE" 123, PC 21, assuming the current balance 57 is sufficient, decrements a player's balance 57 by the amount of coins specified in the field 95 of request 94. At this point, PC 21 determines the random outcome of player's bet 95 by executing the step "GENERATE RANDOM OUTCOME" 124 involving a generation of a pseudo random number with the help of a conventional software utility. If the generated random outcome results in winnings as determined in the test step 125, PC 21 increments a player's balance 57, by the amount won as specified in the pay table of the game stored in the memory of PC 21, in the step "INCREMENT PLAYER's BALANCE" 126. Otherwise, PC 21 directly proceeds to the step "FORM RESPONSE" 127. In the latter step, PC 21 forms data field 91 and the return address 33 of MPU 1 and increments the block sequence number 89. Subsequently, PC 21 computes digital signature 88 utilizing the encoding/decoding key 82 in the step "ENCODE RESPONSE" 129. Finally, PC 21 transmits the fully formed response 87 to MPU 1 via transceiver 16. The response 87 of UDK 2 is received by MPU 1 in the step "RECEIVE RESPONSE" 130 and is decoded in the step "DECODE RESPONSE" 132 with the help of key 82. Specifically, the random outcome of the game 91 is filtered out and is presented on touchscreen 3 in the step "DISPLAY OUTCOME" 132 shown in FIG. 16 illustrating a "display outcome" task.

Figure 17:
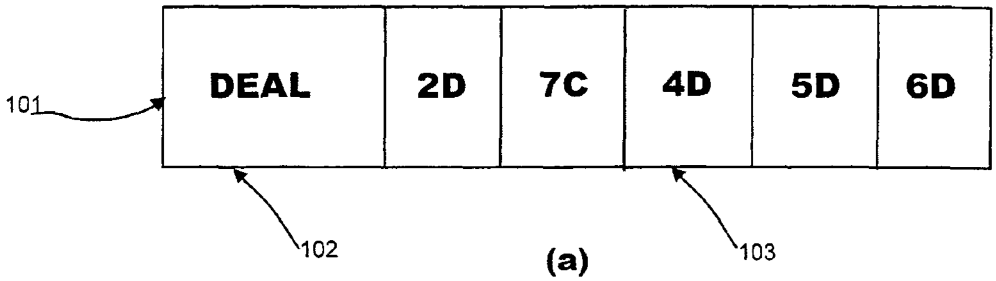
FIG. 17 (*a*) illustrates a "deal" data block of the present invention.
Figure 17:
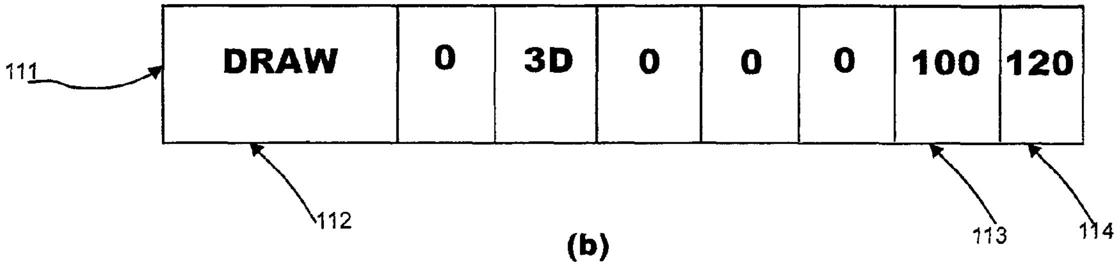

MPU 1 allows playing of a poker game in a similar manner. Specifically, a player touches a toggle touchbutton "DEAL/DRAW" 97 on touchscreen 3 requesting a new "deal." In response, MPU 1 forms a player's request block 83 with the data field 86 structured in the form 98 of a "deal request" data block illustrated in FIG. 12 (*c*) wherein 99 is a number of coins the player bets while the request field 100 specifies a request to generate a random hand of cards. The MPU 1 encodes request 98 with the next authentication key in the database of keys previously downloaded from the UDK 2, and relayed to UDK 2 in the format 83: "manufacturer's identification number 33, followed by a block sequence number 84, followed by a digital signature 85, and ending with a data field 86.". Once UDK 2 receives "DEAL" request 98, PC 21 authenticates the request by reference to its copy of the database of keys, and sends a set of randomly generated cards back to MPU 1 in an encoded and authenticated format 87 with data field 91 structured as shown in FIG. 17 (*a*) illustrating a "deal" data block. Specifically, FIG. 17 (*a*) illustrates a case wherein PC 21 generates a random deal hand consisting of the two of diamonds, seven of clubs, four of diamonds, five of diamonds and six of diamonds. The generated hand is encoded as a data block 101 shown in FIG. 17 (*a*) wherein 102 is a response identification field "DEAL" and 103 is a five-byte long data field containing encoded representation of dealt cards. The received random poker hand is displayed to the player by MPU 1 on its touchscreen 3. The player then makes his selection as to which cards to hold by touching respective cards on the screen 3 and presses the toggle touchbutton "DEAL/DRAW" 97. Once the player does so, MPU 1 sends a request 83 to UDK 2 with the data field 86 structured as "draw request" data block 104 illustrated in FIG. 12 (*d*) wherein the five consecutive fields 105 through 106 indicate respectively which cards the player decided to hold as indicated by their value being equal to one, and which cards are to be discarded as indicated by their value being equal to zero. The main field "DRAW" 110 indicates that this is a request to draw random cards to substitute for the cards the player decided to discard. In this specific case, the player makes an obvious choice to discard the "seven of clubs" and retain the rest of the dealt cards. In response, UDK 2 sends back an encrypted block 87 containing a data filed structured as block 111 shown in FIG. 17 (*b*) illustrating a "draw" data block. The response identification field "DRAW" 112 in FIG. 17 (*b*) indicates that this is an outcome of a poker game. Specifically, the five consecutive bytes of information following the "DRAW" field contain the drawn cards, the next two byte data field 113 contains the amount won by the player, and the last two byte data field 114 contains the player's new account balance. As illustrated in FIG. 17 (*b*), the drawn card is the "three of diamonds", the prize won as a result of the "straight" is one hundred coins, and the player's new balance is one hundred twenty coins. Note that MPU 1 does not have any responsibility for generating random numbers nor maintaining the current player's balance but rather simply displays the balance computed by UDK 2 (or central computer) on behalf of MPU 1.

In a manner similar to that described above, MPU 1 may be adapted to play virtually any casino game, including black jack, keno, roulette, sports book and horse racing. In fact, MPU 1 can play several games concurrently. For example, slots and bingo can be played concurrently as taught in U.S. Pat. No. 4,856,787 to Itkis et al. Moreover, the preferred embodiment illustrated in FIG. 1 can be adapted to implement a broad variety of various applications without departing from the main principles of the invention. For example, although FIG. 1 shows only one UDK 2, a casino may have any number of such UDKs 2 installed throughout the property and integrated in an extended local area network. The networked UDKs 2 can interchange data over a local area network 22 extended beyond a single UDK 2 and can share a common player database 35. In a casino equipped with a number of such networked UDKs 2, a player may rent MPU 1 from a first such UDK 2 and return it to a second such UDK 2.

Moreover, the extended LAN 22 can be equipped with multiple connectors 23 installed throughout the casino, such as near lounge chairs, for convenient player access as illustrated in FIG. 2 by MPU 1 that is positioned outside UDK 2 and is plugged into LAN 22 via a cable 115 leading to connector 23. Once securely downloaded inside UDK 2 with an authentication key database 82, MPU 1 can be carried by a player to any such external outlet of extended LAN 22. Once plugged into socket 23, MPU can directly communicate with UDK 2 (or the central computer) over LAN 22 instead of RF channel 31. Therefore, MPU 1 can send to and receive from UDK 2 data blocks 83 and 87 over LAN 22. Advantages of such a "plug and play" arrangement include the virtual absence of noise, a much higher channel throughput as compared with RF channel 31, and an additional level of security afforded by wired cables. These advantages may well outweigh the additional cost of running LAN 22 throughout casino. Of course, a "plug and play" MPU 1 still must be initially downloaded with a secure encryption key database 82 inside UDK 2 or when securely connected to a POS terminal, otherwise MPU 1 can be easily subverted in transit between UDK 2 and socket 23 installed on the casino floor.

Figure 18:
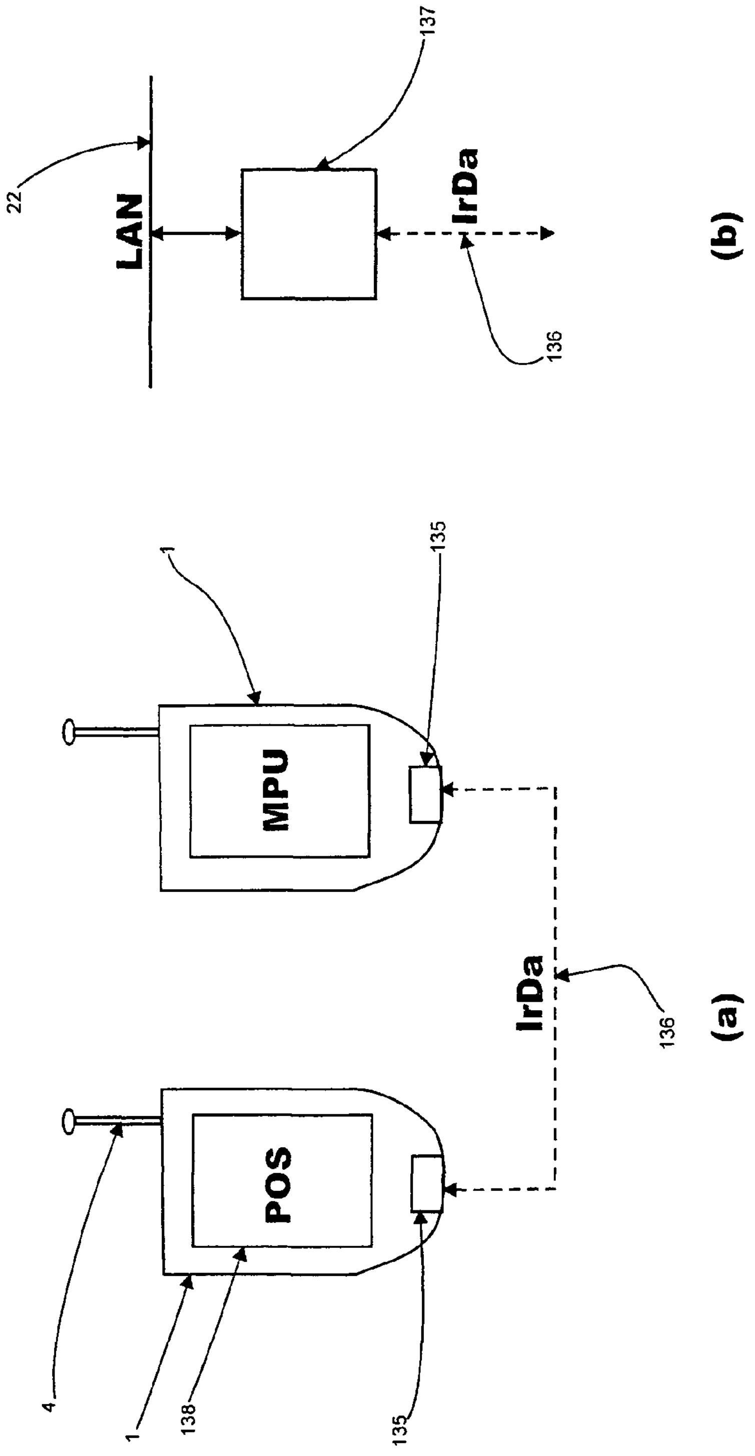
FIG. 18 (*a*) illustrates a lateral communication between two player units via an infrared port of the present invention.

Although connectors 7 and 23 are described as the primary LAN 22 channel for downloading to MPU 1 by UDK 2, their communication function can also be carried out by infrared communication ports built into MPU 1 and UDK 2 as is illustrated in FIG. 18. As shown in FIGS. 18 (*a*) and 18 (*b*) respectively, MPU1 is equipped with infrared (IrDa) communications port 135, while LAN 22 is equipped with a matching IrDa port 137. Note that although infrared ports 135 and 137 are more expensive than connectors 7 and 23, the former do not require a precise alignment of the communicating devices and, therefore, are frequently utilized in PDAs for the purposes of communicating with downloading stations. Ports 135 and 137 allow UDK 2 to download MPU 1 through infrared channel 136. Moreover, a commercial wireless PDA equipped with an infrared port 135 can function as MPU 1, provided it is downloaded by PC 21 not only with encryption key 82 and/or bingo pack 43 but also with the above-described executable program for playing casino games and such downloading is performed via an infrared communication port. Note that techniques of downloading executable files from a stationary device into a portable device are well known and not explained herein. Therefore, an opportunity for a player to bring to the casino a favorite PDA and use it as a personal slot machine may be very attractive for some casinos because it decreases the cost of owning and maintaining the rental fleet of MPU 1 devices.

Similarly, an off-the-shelf programmable telephone equipped with a graphics display and menu-navigation keys 6 may serve as a MPU 1. A broad variety of downloadable "third generation" telephones is available on the market. In case of a telephone-based implementation, a player may use his or her own telephone for playing casino games in the above-described manner, provided of course, that the player's telephone is downloaded with a security key 82 as a precondition for playing casino games. Assuming connector 7 is compatible with the downloading and recharging connector of such a telephone, a player may insert a telephone into any available or reserved slot 17 of UDK 2 and wait a few seconds while PC 21 downloads key 82 into the memory of the player's telephone. In addition to key 82, PC 21 also downloads the above-described casino games into the player's telephone. The downloadable casino games are preferably written in JAVA language since many modern commercial telephones are capable of downloading and executing application programs written in JAVA language.

Infrared port 135 built into MPU 1 also allows for lateral communication between two MPUs 1 as illustrated in FIG. 18 (*a*). Two MPUs 1 can interchange arbitrary data via their respective ports 135. Such a data interchange is secure provided two units 1 are placed in close proximity to one another and their IrDa ports 135 are aimed at each other. Note that a likelihood of intercepting a line-of-site infrared communication between two closely located MPUs 1 by an outsider is negligible. A plug type connection may also be used between mobile units. This opens up an opportunity for utilization of a MPU 1 as a mobile point-of-sale terminal as indicated by numeral 138 in FIG. 18 (*a*). Specifically, one of the MPU 1 units may be allocated to a casino employee. Initially, MPU 1 allocated to a casino employee may be downloaded with a large number of bingo packs 43 as described above. Subsequently, the casino employee may dispense, via aligned infrared ports 135, a portion of the bingo packs 43 stored in its memory to a MPU 1, PDA or telephone in possession of a player. The information about such an indirect downloading of player's MPU 1 by a casino employee may be reported by the employee's MPU 1 to UDK 2 via antenna 4. Since RF communication between the employee's MPU 1 and UDK 2 is inherently secure, the entire process of indirect downloading of the player's MPU 1 is also secure. The data downloaded into player's MPU 1 from the employee's MPU 1 is not limited to bingo cards. A unique data encryption key database 82 reserved for the player can be downloaded from the employee's MPU 1 along with monetary credits and casino games as well.

An alternative for inputting authentication or encryption keys 82 into MPU 1 includes a player reading key 82 from receipt 44 and manually entering key 82 into MPU 1 via a touch-pad on touchscreen 3. Although manual entry of key 82 is subject to error, it may be used as a substitute for the downloading of key 82 in an effort to save costs or in the case of a failure of downloading the key 82 via connectors 7 and 23.

Figure 19:
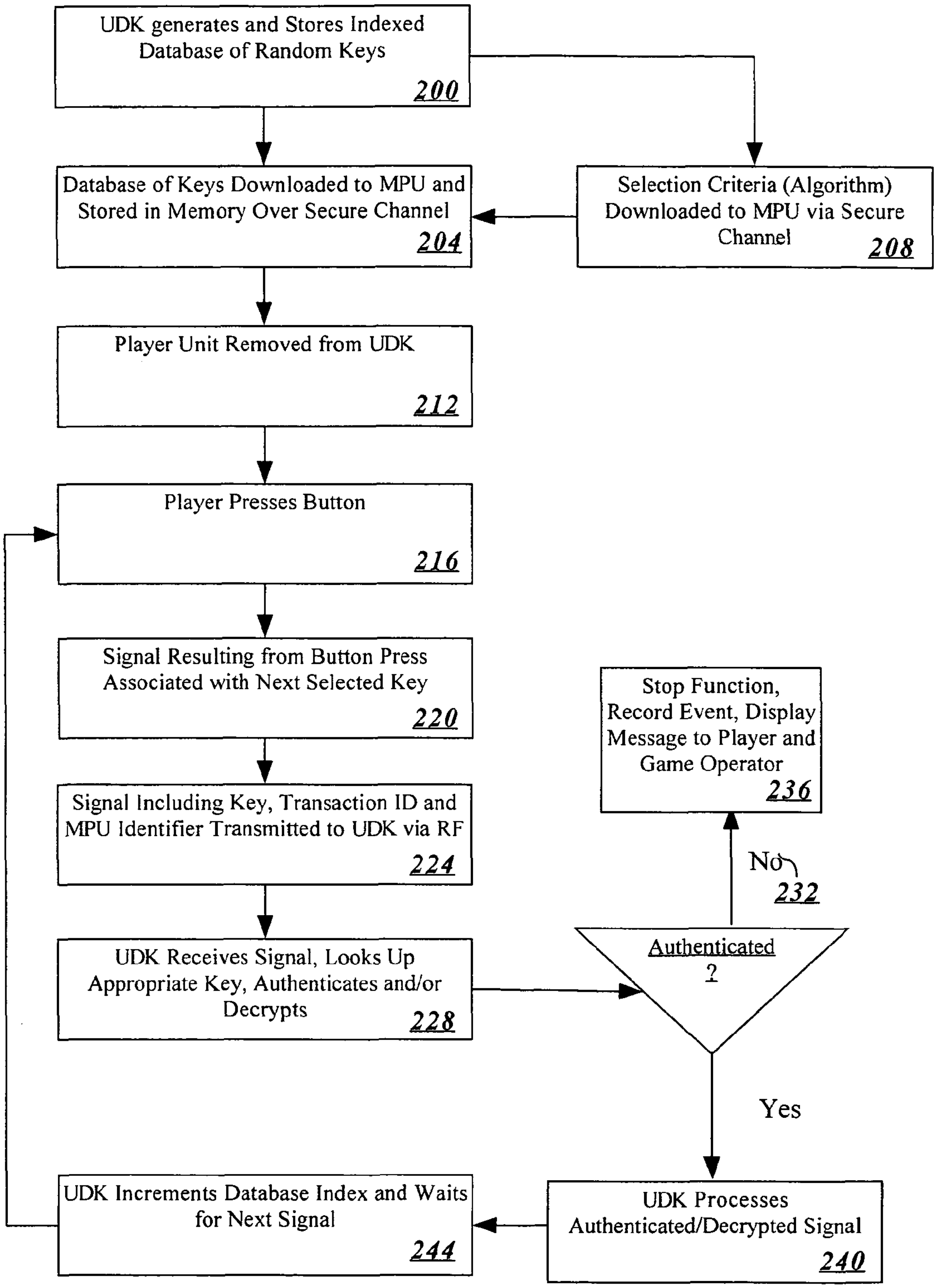
FIG. 19 is a flow chart illustrating the use of a database of authentication/encryption keys.

FIG. 19 illustrates the function of the present invention. In this embodiment, the UDK generates an indexed database of random keys and stores them in its memory 200. When a MPU is inserted into the UDK, the UDK downloads to the MPU a database of indexed keys which is unique to that MPU 204. In addition, a selection criteria is downloaded to the MPU 208. The selection criteria may take the form of an algorithm or a simple listing of the order in which keys are to be used from the database. For example, a database may consist of 1,024 128 bit keys. The selection criteria may be a randomized index list such as 654; 123; 251; 989 etc. Then, as the game is later played, each transaction would use the next key called out in the list. The selection criteria itself may be encrypted to further protect the integrity of the data. For example, to initiate the game, the player may be required to enter a security code (password or pass phrase) to decrypt the selection criteria, or, for that matter, the database itself. Giving the player the opportunity to create her own encryption algorithm passcode gives the player added assurance that even a casino employee cannot break the encryption/authentication keys. Moreover, the authentication keys may be comprised from a combination of sub-keys contained in the database, or from a combination of subkeys in the database and other data stored on the MPU. Once the player removes the unit, and presses a key or the touch screen to initiate a transmitted signal 216, the signal becomes associated with the first authentication key 220 as specified by the selection criteria, in the example above, key number 654. The signal, associated with the specific key, is transmitted to the UDK 224 along with an MPU identifier and transaction number. Upon receiving the signal 212, the UDK looks up the key in its matching database according to the selection criteria previously downloaded to the unit, and authenticates the signal as properly coming from the particular MPU 228. If the authentication key does not properly match, the UDK prevents the transaction, and notifies the operator 232. If the transmission is properly authenticated 236, the UDK increments the database (i.e. records that the previous authentication key has been used) and waits for the next signal 240. Each signal includes an identifier so the UDK knows which MPU is sending the signal, as well as the identifier. Additionally, the signals may be encrypted using a variety of encryption schemes well known in the art. The encryption keys may be the same as the authentication keys, or may be a separate set of keys, or a single key. Preferably, encryption keys should be changed each time the MPU is rented, at the same time as the authentication keys are changed.

The specific implementations disclosed above are by way of example and for enabling persons skilled in the art to implement the invention only. We have made every effort to describe all the embodiments we have foreseen. There may be embodiments that are unforeseeable or which are insubstantially different. We have further made every effort to describe the invention, including the best mode of practicing it. Any omission of any variation of the invention disclosed is not intended to dedicate such variation to the public, and all unforeseen, insubstantial variations are intended to be covered by the claims appended hereto. Accordingly, the invention is not to be limited except by the appended claims and legal equivalents.

We claim:

1. A wagering system comprising:

a central game controller and at least one player gaming device;

wherein at least one of said (i) central game controller and (ii) at least one player gaming device is configured to transmit a database of multiple authentication keys to the other via a secure first communication channel;

said player gaming device configured to transmit to said central game controller a wagering request via a second communication channel and authenticate said wagering request with at least one authentication key from said database; and said central game controller configured to validate said wagering request using said at least one authentication key and transmit a response to said wagering request to said player gaming device via said second communication channel.

2. The wagering system recited in claim 1 wherein at least a portion of said database of multiple authentication keys is used for only one gaming session.

3. The wagering system recited in claim 1 wherein said database of multiple authentication keys is replaced with a new database of multiple authentication keys before the start of a new gaming session.

4. The wagering system recited in claim 1 wherein an order selection specification is stored in said gaming device, said order selection specification used to determine the order in which to select authentication keys from said database during at least one round of gaming.

5. The wagering system of claim 4 wherein said order selection specification is communicated from said central game controller to said gaming device via said secure first communication channel.

6. The wagering system of claim 4 wherein said order selection specification is an algorithm.

7. The wagering system of claim 4 wherein said order selection specification is encrypted.

8. The wagering system of claim 4 wherein said order selection specification is an algorithm, said algorithm generated at least in part by said gaming device.

9. The wagering system of claim 8 wherein said algorithm generation is initiated by player input.

10. The wagering system recited in claim 1 wherein said second communication channel is a wireless communication channel.

11. The wagering system of claim 1 wherein said gaming device is plugged into said secure first communication channel.

12. The wagering system of claim 1 wherein said response is authenticated by at least one data authentication key selected from said database.

13. The wagering system of claim 1 wherein said secure communication means is a wired communication link.

14. The wagering system of claim 1 wherein said gaming device is provided with at least a portion of said database by the central game controller over said secure first communication channel while said gaming device is stored in a dispensing kiosk.

15. The wagering system of claim 1 wherein said gaming device is adapted to play at least one game selected from the group of games consisting of bingo, poker, blackjack, slots, sports book and horse races in response to said central game controller.

16. The wagering system of claim 15 wherein said gaming device is selected from the group consisting of: a telephone, a personal digital assistant, and a portable computer.

17. The wagering system of claim 1 wherein said request includes an order to purchase a game card.

18. The wagering system of claim 17 wherein said game card is a bingo card.

19. The wagering system of claim 1 wherein said secure second communications channel is by infrared light facilitated by said central game controller and said gaming device each having an infrared communication port.

20. The wagering system of claim 1 further including a portable device capable of storing and transmitting data in secure communication with said central game controller.

21. The wagering system of claim 1 further comprising said central gaming computer generating a data authentication key selection algorithm and communicating said algorithm to said gaming device over a secure first communication channel.

22. The wagering system of claim 21 wherein said authentication key selected from said database is determined by said algorithm.

23. The wagering system of claim 1 wherein said gaming device selects a different said authentication key for each request sent to said central game computer.

24. The wagering system of claim 1 wherein said wagering request sent via said second communications channel is encrypted.

25. The wagering system of claim 24 wherein said encryption utilizes at least one encryption key, said at least one encryption key being communicated to said gaming device via said secure first communication channel.

26. The wagering system of claim 25 wherein said at least one encryption key comprises at least one authentication key selected from said database of multiple authentication keys.

27. A wagering method comprising:

configuring at least one of a (i) central game controller and (ii) at least one player gaming device to transmit a database of multiple authentication keys to the other via a secure first communication channel;

configuring said player gaming device to transmit to said central game controller a wagering request via a second communication channel and authenticate said wagering request with at least one authentication key from said database, and configuring said central game controller to validate said wagering request utilizing said authentication key and transmit a response to said wagering request to said player gaming device via said second communication channel.

28. The method of claim 27 further comprising utilizing said central game controller to generate at least a portion of said database of multiple authentication keys.

29. The method of claim 27 further comprising utilizing said gaming device to generate at least a portion of said database of multiple authentication keys.

30. The method of claim 27 further comprising using at least a portion of said database of multiple authentication keys for only one gaming session.

31. The method of claim 27 further comprising replacing said database of multiple authentication keys with a new database of multiple authentication keys before the start of a gaming session.

32. The method of claim 27 further comprising storing an order selection specification in said gaming device, said order selection specification used to determine the order in which to select authentication keys from said database during one or more rounds of gaming.

33. The method of claim 27 further comprising communicating said order selection specification from said central game controller to said gaming device via said secure first communication channel.

34. The method of claim 27 further comprising utilizing an order selection specification in the form of an algorithm.

35. The wagering method of claim 27 further comprising encrypting said order selection specification.

36. The method of claim 27 wherein said communication channel is a wireless communication channel.

37. The method of claim 27 further comprising encrypting said wagering request sent via said second communications channel.

38. The method of claim 37 further comprising utilizing at least one encryption key, said at least one encryption key being downloaded to said gaming device via said secure first communication channel.

39. The method of claim 38 further comprising selecting said at least one encryption key from said database of multiple authentication keys.

40. The method of claim 27 further comprising connecting said gaming device to said secure first communication channel.

41. The method of claim 27 further comprising authenticating said response by at least one data authentication key selected from said database.

42. The method of claim 27 wherein said secure first communication means is a wired communication link.

43. The method of claim 27 further comprising providing said gaming device with database of data authentication keys by the central game controller over said secure first communication channel.

44. The method of claim 27 further comprising adapting said gaming device to play at least one game from a group of games consisting of bingo, poker, blackjack, slots, sports book and horse races in response to said central game controller.

45. The method of claim 44 further comprising selecting said gaming device from the group consisting of: a telephone a personal digital assistant, a portable computer.

46. The method of claim 27 wherein said request includes an order to purchase a game card.

47. The method of claim 46 wherein said game card is a bingo card.

48. The method of claim 27 wherein said secure first communications channel is an infrared link facilitated by said central game controller and said gaming device each having an infrared communication port.

49. The method of claim 27 further comprising including a portable device capable of storing and transmitting data in secure communication with said central game controller.

50. A wagering method comprising:

transmitting a database of multiple authentication keys via a secure first communication channel from a central game controller to at least one player gaming device;

transmitting a wagering request via a second communication channel from said player gaming device to said central game controller;

authenticating said wagering request with at least one authentication key from said database;

validating the wagering request utilizing said game controller and authentication key; and transmitting a response to the wagering request to said player gaming device via said second communication channel.

51. A wagering method comprising:

transmitting a database of multiple authentication keys via a secure first communication channel from at least one player gaming device to a game controller;

transmitting a wagering request via a second communication channel from said player gaming device to said central game controller;

authenticating said wagering request with at least one authentication key from said database;

validating the wagering request utilizing said game controller and authentication key; and transmitting a response to the wagering request to said player gaming device via said second communication channel.

* * * * *